US012624786B2

(12) United States Patent
    Strauss et al.

(10) Patent No.: US 12,624,786 B2
(45) Date of Patent: May 12, 2026

(54) QUICK DISCONNECT COUPLING SYSTEMS AND RELATED METHODS

(71) Applicant: BLUE ORIGIN MANUFACTURING, LLC, Huntsville, AL (US)

(72) Inventors: Randall J. Strauss, Tacoma, WA (US); William Goettler, Kent, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/537,441

(22) Filed: Dec. 12, 2023

(65) Prior Publication Data

US 2024/0102595 A1      Mar. 28, 2024

Related U.S. Application Data

(60) Division of application No. 17/682,864, filed on Feb. 28, 2022, now Pat. No. 11,879,580, which is a continuation of application No. 16/898,317, filed on Jun. 10, 2020, now Pat. No. 11,262,014.

(51) Int. Cl.
    *F16L 37/34*      (2006.01)
    *B64G 1/40*       (2006.01)
    *B67D 7/36*       (2010.01)

(52) U.S. Cl.
    CPC .............. *F16L 37/34* (2013.01); *B64G 1/402* (2013.01); *B67D 7/36* (2013.01)

(58) Field of Classification Search
    CPC ................................. F16L 37/32; F16L 37/34
    USPC .......................................... 137/614.02–614.5
    See application file for complete search history.

(56) References Cited

U.S. PATENT DOCUMENTS

| | | | |
|---|---|---|---|
| 2,951,713 A | | 9/1960 | Nilsson |
| 5,123,446 A | | 6/1992 | Haunhorst et al. |
| 5,123,447 A | | 6/1992 | Calvin et al. |
| 5,179,976 A | | 1/1993 | Boland et al. |
| 5,191,914 A | * | 3/1993 | Gonzalez ................ F16L 37/35 |
| | | | 137/614 |

(Continued)

FOREIGN PATENT DOCUMENTS

| | | |
|---|---|---|
| DE | 19624365 | 10/1997 |
| EP | 1629230 | 7/2009 |

OTHER PUBLICATIONS

Non-Final Rejection issued in U.S. Appl. No. 17/682,864, dated Mar. 17, 2023.

(Continued)

*Primary Examiner* — Paul J Gray
(74) *Attorney, Agent, or Firm* — Hogan Lovells US LLP

(57) ABSTRACT

Quick disconnect devices for high pressure fluid transfer, and associated systems and methods are disclosed. A representative quick disconnect system includes a first connector and a second connector. The second connector can have an opening sized and shaped to receive a first end of the first connector. The second connector can include a poppet positioned to open the first connector when the first connector is connected to the second connector. The second connector can include an inner sleeve moveable between a first position wherein the poppet head forms a fluid-tight seal with the annular seat of the inner sleeve, and a second position wherein the second end portion is open to permit fluid flow through the end portion of the inner sleeve. In some embodiments, the inner sleeve is pressure balanced in every direction.

20 Claims, 16 Drawing Sheets

(56) References Cited

U.S. PATENT DOCUMENTS

| | | | |
|---|---|---|---|
| 6,026,857 | A | 2/2000 | Stucchi |
| 6,082,401 | A * | 7/2000 | Braun ................. F16L 37/0841 |
| | | | 137/614.04 |
| 6,382,251 | B1 | 5/2002 | Hopson |
| 6,776,187 | B1 | 8/2004 | Marquis et al. |
| 7,836,912 | B2 | 11/2010 | Jang et al. |
| 9,709,199 | B2 | 7/2017 | Laufer et al. |
| 11,262,014 | B2 | 3/2022 | Strauss et al. |
| 2005/0088812 | A1 | 4/2005 | Hillman |
| 2010/0320752 | A1 | 12/2010 | Alstad |
| 2013/0206261 | A1 | 8/2013 | Prust et al. |
| 2015/0377402 | A1 | 12/2015 | Boothe et al. |
| 2016/0369923 | A1 | 12/2016 | Danelli et al. |
| 2017/0261140 | A1 | 9/2017 | Gennasio |
| 2019/0390809 | A1 | 12/2019 | Chetan |
| 2020/0284387 | A1 | 9/2020 | Wall |

OTHER PUBLICATIONS

Notice of Allowance issued in U.S. Appl. No. 17/682,864, dated Sep. 1, 2023.
Notice of Allowance issued in U.S. Appl. No. 17/682,864, dated Sep. 12, 2023.
Original and Translation of DE 19624365 01; Hartmann, Juergen; Weiland, Fritz Georg; Oct. 23, 1997.
Non-Final Rejection issued in U.S. Appl. No. 16/898,317, dated Jun. 25, 2021.
Notice of Allowance issued in U.S. Appl. No. 16/898,317, dated Dec. 7, 2021.
Non-Final Office Action issued in U.S. Appl. No. 18/510,450, dated Sep. 16, 2024.
Final Office Action issued in U.S. Appl. No. 18/510,450, dated Mar. 28, 2025.

* cited by examiner

FLIGHT ⟵  ⟶ GROUND

QUICK DISCONNECT COUPLING SYSTEMS AND RELATED METHODS

INCORPORATION BY REFERENCE TO RELATED APPLICATION(S)

Any and all applications for which a foreign or domestic priority claim is identified in the Application Data Sheet as filed with the present application are hereby incorporated by reference under 37 CFR 1.57. For example, this is a divisional application that is related to and that claims the benefit of priority from allowed U.S. patent application Ser. No. 17/682,864, filed Feb. 28, 2022, which in turn claims the benefit of priority to and is a continuation of U.S. patent application Ser. No. 16/898,317, filed Jun. 10, 2020, now U.S. Pat. No. 11,262,014 both entitled "QUICK DISCON-NECT COUPLING SYSTEMS AND RELATED METH-ODS," the entire contents of which are incorporated by reference herein and form a part of this specification for all purposes.

TECHNICAL FIELD

The present disclosure is directed generally to quick disconnect couplings, and associated systems and methods.

BACKGROUND

Rockets have been used for many years to launch human and non-human payloads into orbit. Such rockets delivered the first humans to space and to the moon, and have launched countless satellites into the Earth's orbit and beyond. Such rockets are used to propel unmanned space probes and more recently to deliver structures, supplies, and personnel to the orbiting international space station.

In order to reach orbit, rockets and other launch vehicles must be provided with fuel, hydraulic fluid, coolant, and/or other fluids, many of which are transferred and stored at very high pressures. One challenge associated with transferring high-pressure fluid to the rockets is avoiding fluid leaks at the connections between the rockets and fluid sources (e.g., tanks). Aspects of the present disclosure are directed to addressing this and other challenges.

DETAILED DESCRIPTION

Embodiments of the technology disclosed herein are directed generally to quick disconnect systems for providing fluid connections between two or more fluid vessels. For example, the quick disconnect systems disclosed herein can be used to fluidly connect fluid systems on and/or in a launch vehicle to an external fluid source. The quick disconnect systems disclosed herein can include both ground-side and flight-side connectors configured to couple and decouple with each other. One or both of the ground-side and flight-side connectors can include components configured to reduce or eliminate leaks, pressure blow-off, and/or other adverse events when the connectors are coupled to, and decoupled from, each other. For example, one or both of the connectors can include pressure balanced structures configured to operate with little or no force imbalance imparted from pressurized fluid within the connectors when the connectors are coupled to each other. As used herein, "pressure balanced" refers to components for which, when the connectors are coupled to each other, pressure forces imparted to the components by the pressurized fluid within the connectors are balanced in the axial, radial, and circumferential directions, with respect to the longitudinal axes of the connectors. In other words, the pressure "footprints" of the pressure balanced components in are equal when observed in opposing axial directions, in opposing radial directions, and in opposing circumferential directions. In some embodiments, the flight and/or ground-side connectors can include one or more features that are isolated from the pressurized fluid within the connectors. Such isolated features can be configured to operate without being subject to pressure forces from the pressurized fluid.

To avoid obscuring other aspects of the disclosure, several details describing structures and processes that are well-known and often associated with such quick disconnect systems are not set forth in the following description. Moreover, although the following disclosure sets forth several other embodiments, several other embodiments can have different configurations, arrangements, and/or components than those described in this section. In particular, other embodiments may have additional elements, and/or may lack one or more of the elements described below with reference to FIGS. 1-7C.

Figure 1:
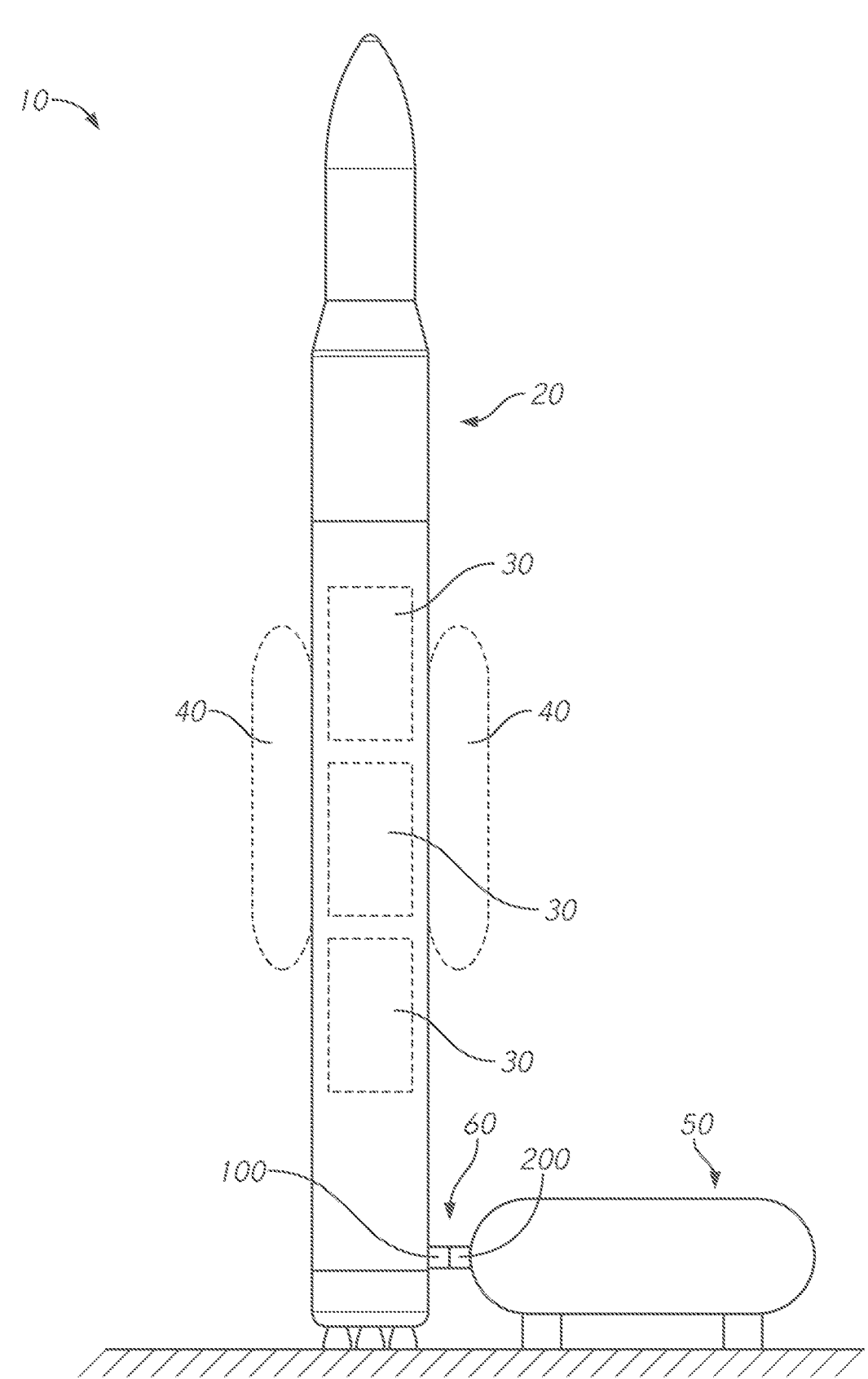
FIG. 1 is a partially schematic, side elevation view of a representative rocket, a fluid source, and a quick disconnect system connecting the rocket to the fluid source.

FIG. 1 is a partially schematic illustration of a representative system 10 configured in accordance with embodiments of the present technology. The system 10 can include a vehicle 20 (e.g., a launch vehicle) having a single or a multi-stage configuration. In the representative embodiment shown in FIG. 1, the vehicle 20 includes one or more internal fluid systems 30 and/or one or more external fluid systems 40. The fluid systems 30, 40 can be, for example, fuel tanks, hydraulic systems, coolant systems, and/or other systems requiring fluid. The fluid used by the fluid systems can include, without limitation, gaseous hydrogen, gaseous helium, gaseous nitrogen, gaseous oxygen, hydrogen peroxide, and/or other suitable fluids. In some embodiments, the fluid systems are configured for cryogenic uses and may require liquid fluids.

The various fluid systems 30, 40 can be filled or refilled using an external fluid source 50. The external fluid source 50 can be, for example, a tank, truck, or other fluid container. Often, the fluid within the fluid source 50 is stored at a very high pressure. For example, the fluid can be maintained at pressures up to or exceeding 6,500 pounds per square inch gauge (PSIG). In some embodiments, the fluid within the fluid source 50 is stored at pressures between 0 PSIG and 7,500 PSIG. The fluids may be maintained at temperatures between −60° F. and 400° F. In some embodiments, the fluids are maintained at cryogenic temperatures.

The external fluid source can be connected to one or more of the fluid systems 30, 40 via a quick disconnect system 60. The quick disconnect system can include a first (e.g., flight-side) connector 100 and a second (e.g., ground-side) connector 200 configured to connect to, and disconnect from, each other. The flight-side connector 100 can be permanently or temporarily connected to the fluid systems 30, 40 and configured to prevent ingress or egress of fluid through the flight-side connector 100 when disconnected from the ground-side connector 200. The ground-side connector 200 can be removably or permanently connected to the external fluid source 50 and configured to prevent ingress or egress of fluid through the ground-side connector 200 when disconnected from the flight-side connector 100.

Figure 2:
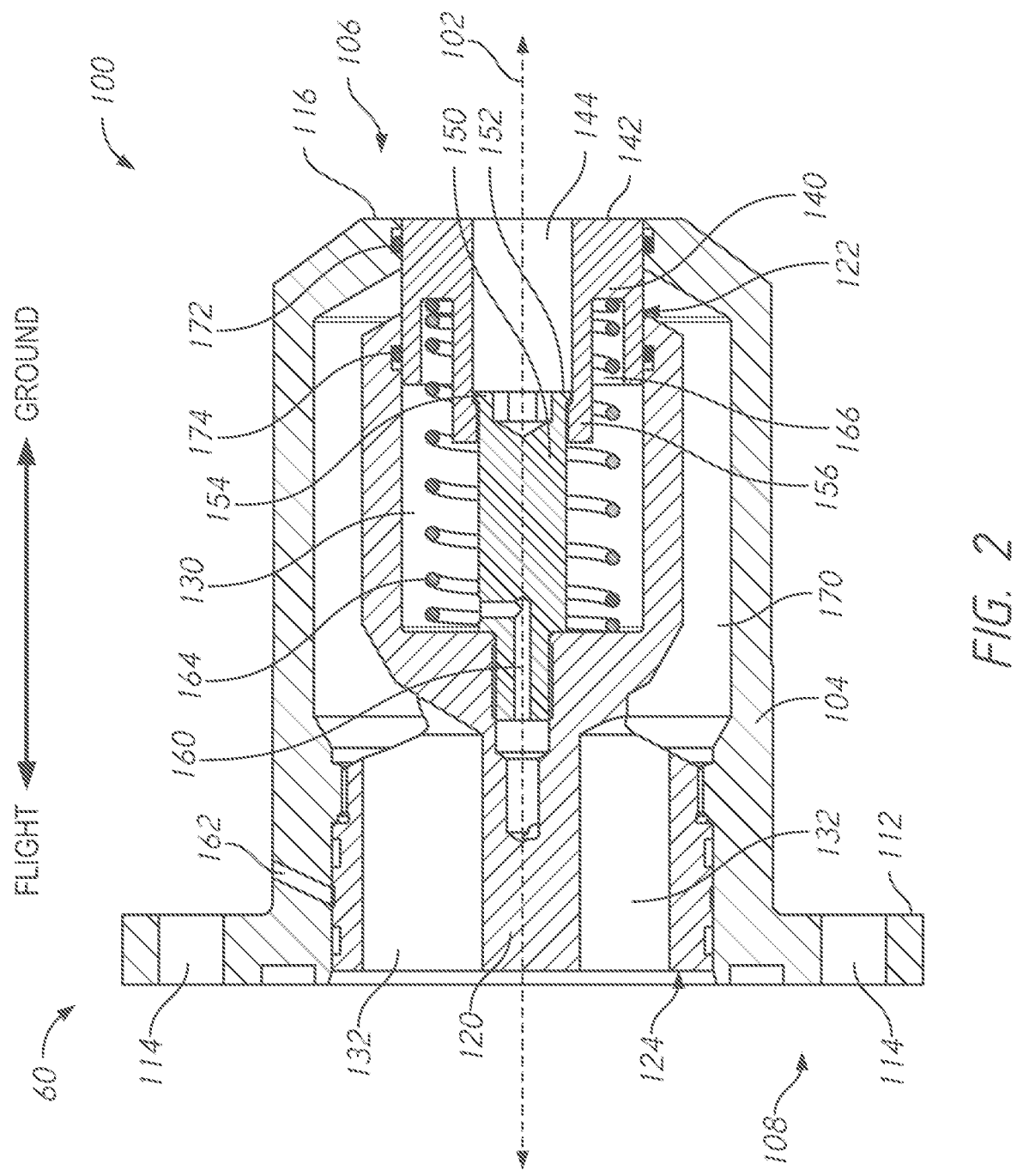
FIG. 2 is a cross-sectional side view of a first connector of a quick disconnect system configured in accordance with embodiments of the present technology.

FIG. 2 is a cross-sectional illustration of an embodiment of the flight-side connector 100 shown in FIG. 1, disconnected from the ground-side connector 200 (FIG. 1). The flight-side connector 100 can include a longitudinal axis 102, an outer sleeve 104 having a first end 106 (e.g., a ground-side end), and a second end 108 (e.g., a flight-side end) opposite the first end along the longitudinal axis 102. The first end 106 can include an opening or inlet. The second end 108 can include an outlet. In some embodiments, the second end 108 includes a mating structure configured to connect the flight-side connector 100 to a launch vehicle 20 (FIG. 1) or other fluid destination. The mating structure can be, for example, a flange 112 having one or more bores 114 through which fasteners may be inserted. The first end 106 of the outer sleeve 104 can include a sleeve mating face 116 configured to engage with a portion of the ground-side connector 200, described further with reference to FIG. 2.

The flight-side connector 100 can include an inner housing 120 positioned at least partially within the outer sleeve 104. In some embodiments, the inner housing 120 is positioned entirely within the outer sleeve 104. The inner housing 120 can have a first end 122 (e.g., a leading end or ground-side end) and a second end 124 (e.g., a flight-side end) opposite the first end 122 of the inner housing 120. The inner housing 120 can include a piston chamber 130 having an opening at the first end 122 of the inner housing 120. In some embodiments, the inner housing 120 includes one or more apertures 132 that form fluid paths or passages through a portion of the inner housing 120.

As is also shown in FIG. 2, the flight-side connector 100 can include a piston 140 (e.g., a flight-side piston). The piston 140 can be positioned at least partially within one or both of the outer sleeve 104 and the piston chamber 130 of the inner housing 120. The piston 140 can have a mating face 142 at the end of the piston 140 nearest the first end 106 of the outer sleeve 104. In some embodiments, the mating face 142 of the piston 140 is flush with the first end 106 (e.g., with the mating face 116) of the outer sleeve 104 when the piston is in a first position (e.g., a closed position). An end of the piston 140 opposite the mating face can be positioned within the piston chamber 130. The piston 140 can include an inner bore 144 (e.g., a piston bore) extending through all or most of the piston 140 in a direction parallel to the longitudinal axis 102 of the flight-side connector 100.

A piston retainer 150 may be positioned at least partially within the piston chamber 130. The piston retainer 150 can have, for example, an elongate shape. In some embodiments, the piston retainer 150 extends at least partially through the piston bore 144. The piston retainer 150 can be fixed at one end to the inner housing 120. The opposite end of the piston retainer 150 can include retainer mating face 152 and an outer flange 154 configured to engage with an inner flange 156 of the piston bore 144. The outer flange 154 of the piston retainer 150 can limit the movement of the piston 140 in the ground direction and can form a seal with the inner flange 156 of the piston bore 144 when the flight-side connector 100 is in a closed or sealed configuration (as illustrated in FIG. 2). In some embodiments, the piston retainer 150 can include a vent 160 through at least a portion of the piston retainer 150 which can vent the piston chamber 130 to an exterior of the flight-side connector 100. For example, the vent 160 of the piston retainer 150 can be in fluid communication with an outer sleeve vent 162 (e.g., through a channel (not shown) in the inner housing 120). The outer sleeve vent 162 can, in turn, be in fluid communication with the ambient environment surrounding the quick disconnect system 60.

In some embodiments, the piston chamber 130 includes a spring 164 or other biasing structure configured to bias the piston 140 in the ground direction. The piston 140 can include a spring retaining portion 166 on the side of the piston opposite the mating face 142. The spring retaining portion 166 can be, for example, an annular groove or pocket configured to receive one end of the spring 164. The other end of the spring 164 can abut a wall of the piston chamber 130.

The flight-side connector 100 can include a fluid flow path extending between the first end 106 of the outer sleeve and the second end 108 of the outer sleeve. As illustrated in FIG. 2, a first portion 170 of the fluid path can extend in an annular fashion from the first end 106 of the outer sleeve 104 between the inner housing 120 and an inner wall of the outer sleeve 104. The fluid path can continue through the one or more apertures 132 in the inner housing 120 to the second end 108 of the outer sleeve 104. The outer sleeve 104 can include a seal 172 (e.g., a piston seal) adjacent the first end 106 of the outer sleeve 104. The piston seal 172 can be, for example, an elastomeric O-ring or other similar structure configured to seal an outer wall of the piston 140 against the outer sleeve 104 when the piston 140 is in the closed position. The flight-side connector 100 can include a chamber seal 174 near the first end 122 of the inner housing 120. The chamber seal 174 can also be an elastomeric O-ring or similar structure configured to prevent fluid passage between the piston 140 and the inner housing 104 when the piston 140 is in the closed position.

Figure 3:
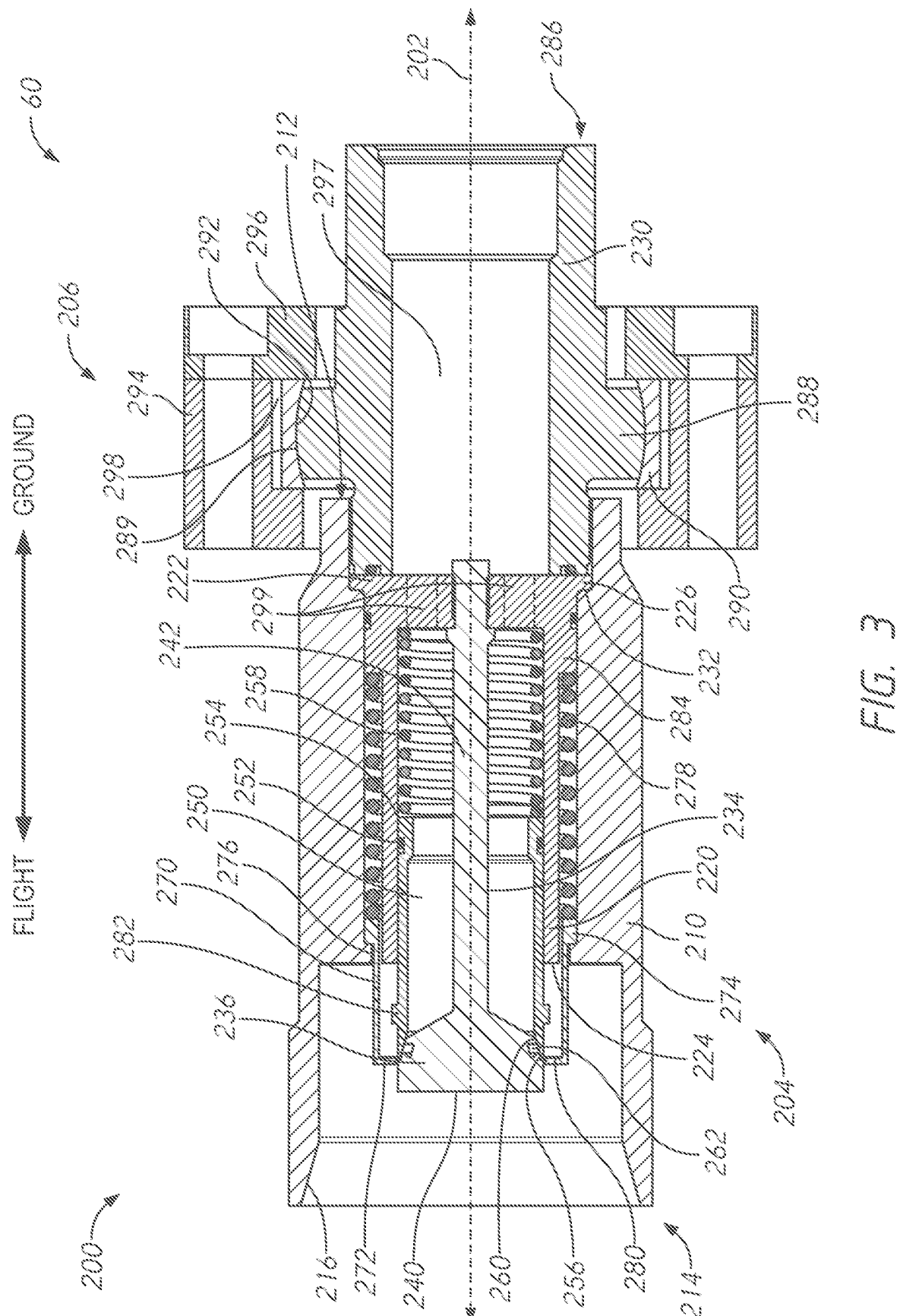
FIG. 3 is a cross-sectional side view of a second connector of a quick disconnect system configured in accordance with embodiments of the present technology.

FIG. 3 is a cross-sectional illustration of an embodiment of the ground-side connector 200 shown in FIG. 1, disconnected from the flight-side connector 100 (FIG. 2). The ground-side connector 200 can have a longitudinal axis 202 and can include a quick disconnect portion 204 and an attachment portion 206 connected to the quick disconnect portion 204. The quick disconnect portion 204 can be configured to connect to, and disconnect from, the ground-side end of the flight-side connector 100. The attachment portion 206 can be configured to connect to a tank or other external fluid source 50.

The quick disconnect portion 204 of the ground-side connector 200 can include an outer sleeve 210 having a first end 212 (e.g., a ground-side end) and a second end 214 (e.g., a flight-side end). The second end 214 of the outer sleeve 210 of the ground-side portion 200 can include an opening 216 configured to receive the ground-side end of the flight-side connector 100. In some embodiments, the second end 214 of the outer sleeve 210 is chamfered, tapered, or otherwise formed to guide the ground-side end of the flight-side connector 100 into the second end 214 of the outer sleeve 210.

The ground-side connector 200 can include a poppet sleeve 220 positioned at least partially within the outer sleeve 210 of the ground-side connector 200. In some embodiments, the poppet sleeve 220 has a generally cylindrical shape. The poppet sleeve 220 can have a closed end 222 at or near the first end 212 of the outer sleeve 210 and an open end 224 opposite the closed end 222 along the longitudinal axis 202. The closed end 222 of the poppet sleeve 220 can be affixed to the outer sleeve 210 of the ground-side connector 200 via an adhesive, weldment, fastener, or other suitable attachment structure or method. In the illustrated embodiment, the closed end 222 of the poppet sleeve 220 includes an outer flange 226 that is wedged and/or compressed between the attachment portion 206 (e.g., a pivot adapter 230 thereof) and an inner step 232 of the outer sleeve 210.

The ground-side connector 200 can include a poppet 234 positioned at least partially within the poppet sleeve 220. The poppet 234 can include a head portion 236 having a mating face 240. The mating face 240 of the poppet 234 can be sized and shaped to match the size and shape of the mating face 142 of the piston 140 of the flight-side connector 100 (FIG. 2). In some embodiments, the mating face 240 of the poppet 234 has an outer perimeter that matches an outer perimeter of the mating face 142 of the piston 140. The poppet 234 can include a poppet stem 242 extending from the head portion 236 in a direction opposite the mating face 240 of the poppet 234. In some embodiments, the poppet 234 is fixed to the poppet sleeve 220 such that the poppet 234 is prevented from moving with respect to the poppet sleeve 220. In some embodiments, the poppet stem 242 can be affixed or otherwise connected to the closed end 222 of the poppet sleeve 220.

The ground-side connector 200 can include an inner sleeve 250 surrounding at least a portion of the poppet 234.

In some embodiments, the inner sleeve 250 is positioned at least partially within the poppet sleeve 220. The inner sleeve 250 can have a generally cylindrical shape. A sleeve seal 252 (e.g., an O-ring or other sealing structure) can be positioned between the inner sleeve 250 and the poppet sleeve 220 and can prevent fluid from passing past the inner sleeve 250 between the inner sleeve 250 and the poppet sleeve 220. The sleeve seal 252 can be positioned, for example, in an annular groove on an outer wall of the inner sleeve 250.

The inner sleeve 250 can have a first end 254 (e.g., a ground-side end) and a second end 256 (e.g., a flight-side end) opposite the first end 254. The first end 254 of the inner sleeve 250 can abut a spring 258 or other biasing structure positioned between the first end 254 of the inner sleeve 250 and the closed end 222 of the poppet sleeve 220. The spring 258 can bias the inner sleeve 250 into contact with the poppet 234 (e.g., the head portion 236 of the poppet 234). In particular, the second end 256 of the inner sleeve 250 can include a poppet seat 260 against which the poppet 234 (e.g., the head portion 236 of the poppet 234) can rest. The poppet seat 260 can be, for example, an inner tapered portion of the second end 256 of the inner sleeve 250. The ground-side connector 200 can include a poppet seal 262 configured to seal the interface between the head portion 236 of the poppet 234 and the poppet seat 260. The poppet seal 262 can be, for example, an O-ring or other similar sealing structure. The poppet seal 262, as illustrated, can be positioned in an annular groove on the head portion 236 of the poppet 234.

In some embodiments, the ground-side connector 200 includes an abutment sleeve 270. The abutment sleeve 270 can be positioned at least partially within the outer sleeve of the ground-side connector 200. The abutment sleeve 270 can surround at least a portion of the inner sleeve 250, the poppet 234, and the poppet sleeve 220. The abutment sleeve 270 can include a mating surface 272 (e.g., a first end) nearest the second end 214 of the outer sleeve 210. The mating surface 272 of the abutment sleeve 270 can be configured to engage with a portion of the flight-side connector 100, as described in more detail below. An opposite end (e.g., a second end) of the abutment sleeve 270 can include an outer flange 274 or other structure configured to engage with the outer sleeve 210 (e.g., an inner flange 276 thereof) and to prevent movement of the abutment sleeve 270 past a predetermined position toward the second end 214 of the outer sleeve 210. A spring 278 or other biasing structure can surround at least a portion of the poppet sleeve 220 and can bias the abutment sleeve 270 toward the second end 214 of the outer sleeve 210. The spring 278 can be seated between the outer flange 274 of the abutment sleeve 270 and an outer projection 284 of the poppet sleeve 220. The abutment sleeve 270 can include an inner flange 280 at or near the mating surface 272 of the abutment sleeve 270. The inner flange 280 of the abutment sleeve 270 can be configured to contact an outer flange 282 or ridge of the inner sleeve 250 when the abutment sleeve 270 moves toward the first end 214 of the outer sleeve 210 of the ground-side connector 200. In some embodiments, the outer flange 282 is an annular protrusion from a radially-outer surface of the inner sleeve 250. In some embodiments, the outer flange 282 includes a plurality of protrusions separated by gaps in the circumferential direction with respect to the longitudinal axis 202 of the ground-side connector 200.

As illustrated in FIG. 3, the attachment portion 206 can include a pivot adapter 230, introduced above. The first end 286 of the pivot adapter 230 can form an inlet to the ground-side connector 200. The pivot adapter 230 can include one or more ridges, ribs, flanges, or other structures extending radially outwardly from the pivot adapter 230. For example, the pivot adapter 230 can include an annular ridge 288 having a gimbaled (e.g., rounded) surface 289 on a radially-outward portion thereof.

The attachment portion 204 can include a retaining ring 290 configured to engage with the gimbaled surface of the annular ridge 288 of the pivot adapter 230. The retaining ring 290 can have an inner gimbaled portion 292 shaped and sized to permit the pivot adapter 230 to tilt with respect to the retaining ring 290. The retaining ring 290 and the annular ridge 288 of the pivot adapter 230 can be captured between a wall 294 of the external fluid source 50 (FIG. 1) and a retainer 296. The retainer 296 can be affixed to the wall 294 via fasteners, weldments, adhesives, and/or other suitable attachment methods and structures. In some embodiments, the retainer ring 290 can have an outer diameter smaller than an inner diameter of the space 298 in which the annular ring is captured. The retainer ring 290 can also be thinner than the space 298 in a direction parallel to the longitudinal axis 202 of the ground-side connector 200 to allow the pivot adapter 230 to move with respect to the wall 294 of the external fluid source 50 in a direction parallel to the longitudinal axis 202. In total, the interface between the annular ridge 288 and the retaining ring 290 can permit the pivot adapter 230 and/or the external fluid source 50 to move relative to each other with six degrees of freedom. More specifically, the pivot adapter 230 can rotate (e.g., about the longitudinal axis 202 of the ground-side connector 200), translate, and tilt with respect to the wall 294 of the external fluid source 50. With reference to FIG. 1, this freedom of motion can reduce the risk of damage to the quick disconnect system 60, to the launch vehicle 20, and/or to the external fluid source 50 as the flight-side connector 100 and the ground-side connector 200 are connected to, and disconnected from, each other.

Returning to FIG. 3, the ground-side connector 200 can include a fluid path extending from the first end 286 of pivot adapter 230 through to the second end 214. The first end 286 of the pivot adapter 230 can form an inlet to the fluid path. The fluid path can continue through an interior bore 297 of the pivot adapter 230, and through one or more apertures 299 formed in the closed end 222 of the poppet sleeve 220. The fluid path continues through the interior of the poppet sleeve 220 and through an interior of the inner sleeve 250. When the inner sleeve 250 is engaged with the poppet 234, the fluid path ends at the poppet seal 262. When, however, the inner sleeve 250 is withdrawn from the head portion 236 of the poppet 234, the fluid path continues around the head portion 236 of the poppet 234 and through the second end 214 of the outer sleeve 210 of the ground-side connector 200.

Figure 4A:
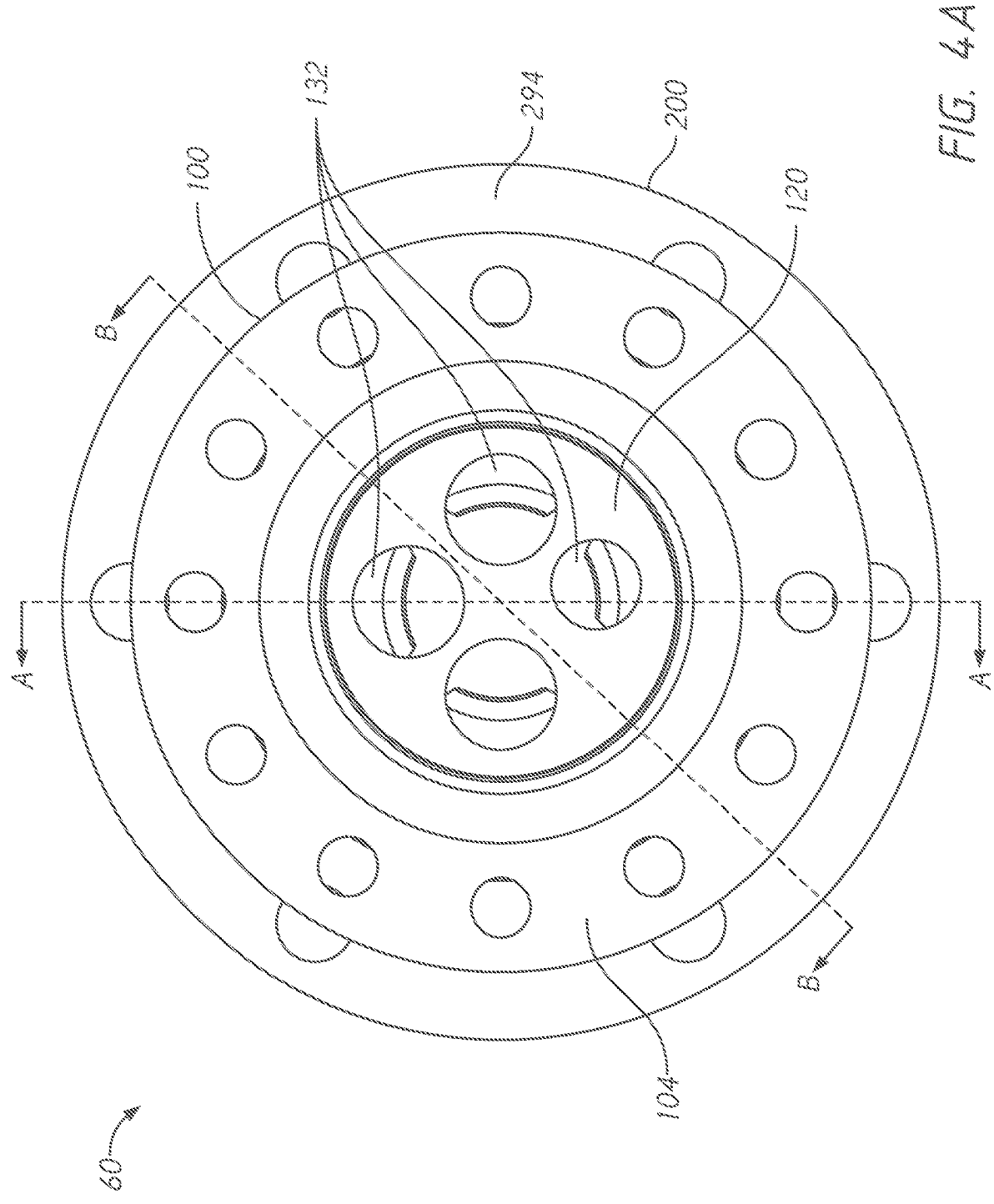
FIG. 4A is an end view of the first connector of FIG. 2 mated with the second connector of FIG. 3.

FIG. 4A is an end view of the flight-side connector 100 and the ground-side connector 200 in an engaged or coupled configuration. As illustrated, the inner housing 120 can include two or more apertures 132. In some embodiments, the inner housing 120 includes three, four, or more apertures 132. In some embodiments, all of the apertures 132 have the same cross-sectional area as measured perpendicular to the longitudinal axis 102 of the flight-side connector 100 or, as illustrated in FIG. 4A, one or more of the apertures 132 can have a cross-sectional area greater than or smaller than the cross-sectional area of another aperture 132.

Figure 4B:
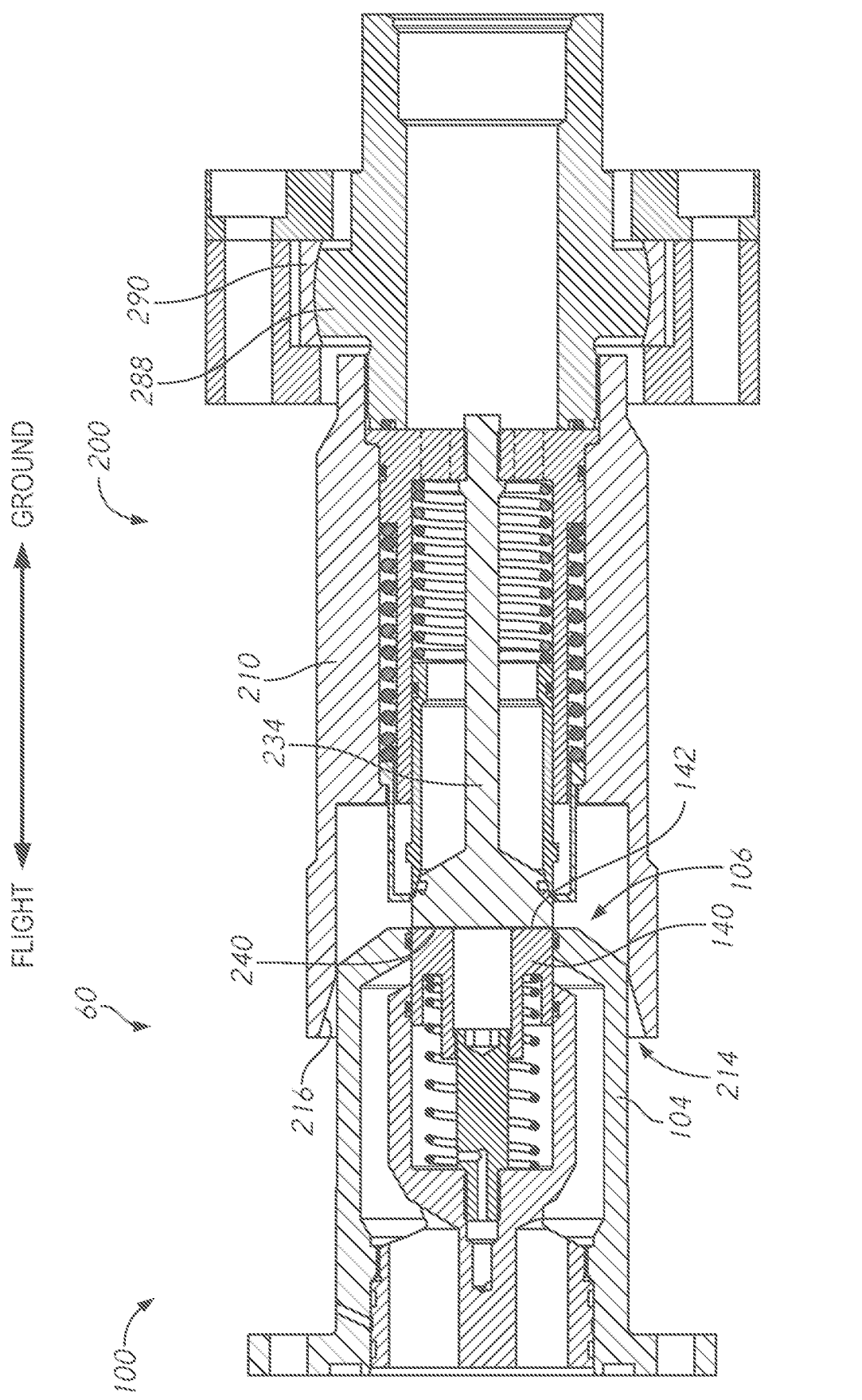
FIG. 4B is a cross-sectional side view of the first and second connectors of FIG. 4A, taken along cut-plane A-A of FIG. 4A when a poppet of the second connector first contacts a piston of the first connector.
Figure 4C:
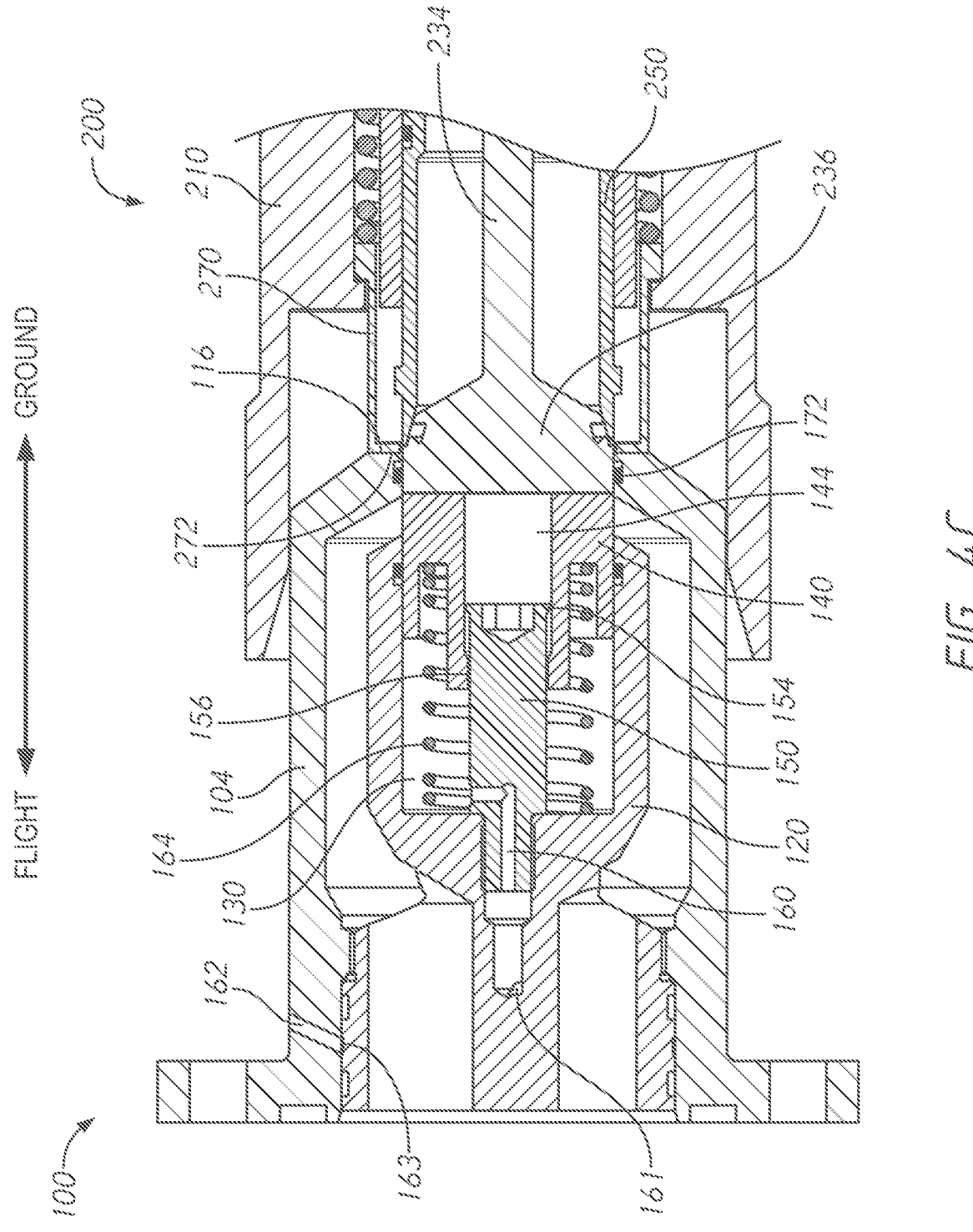
FIG. 4C is the cross-sectional side view of the first and second connectors shown in FIG. 4B, at a point when an abutment sleeve of the second connector first contacts an outer housing of the first connector.
Figure 4D:
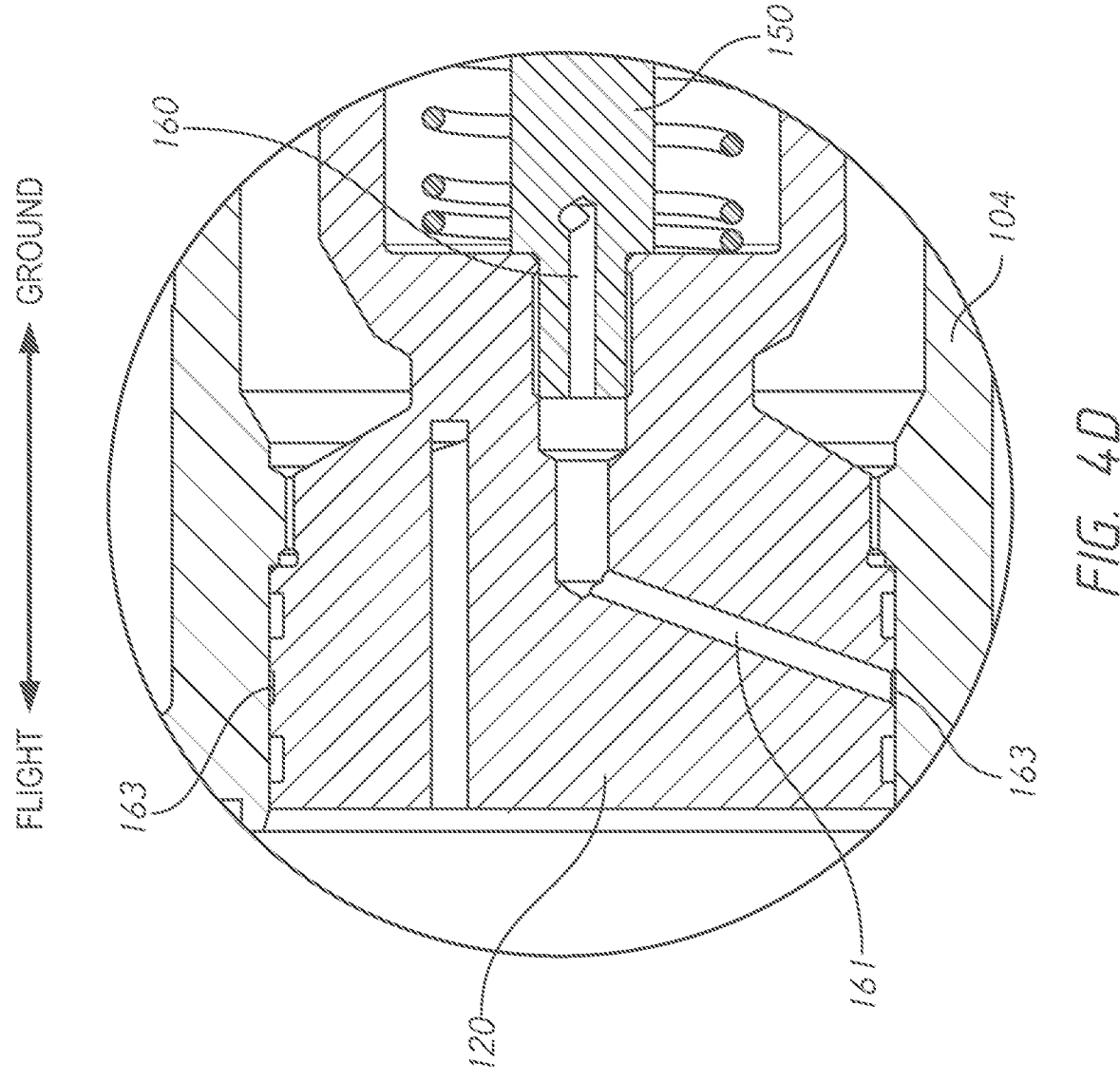
FIG. 4D is a close-up cross-sectional side view of the first connector of FIG. 2, taken along the cut-plane B-B of FIG. 4A.
Figure 4E:
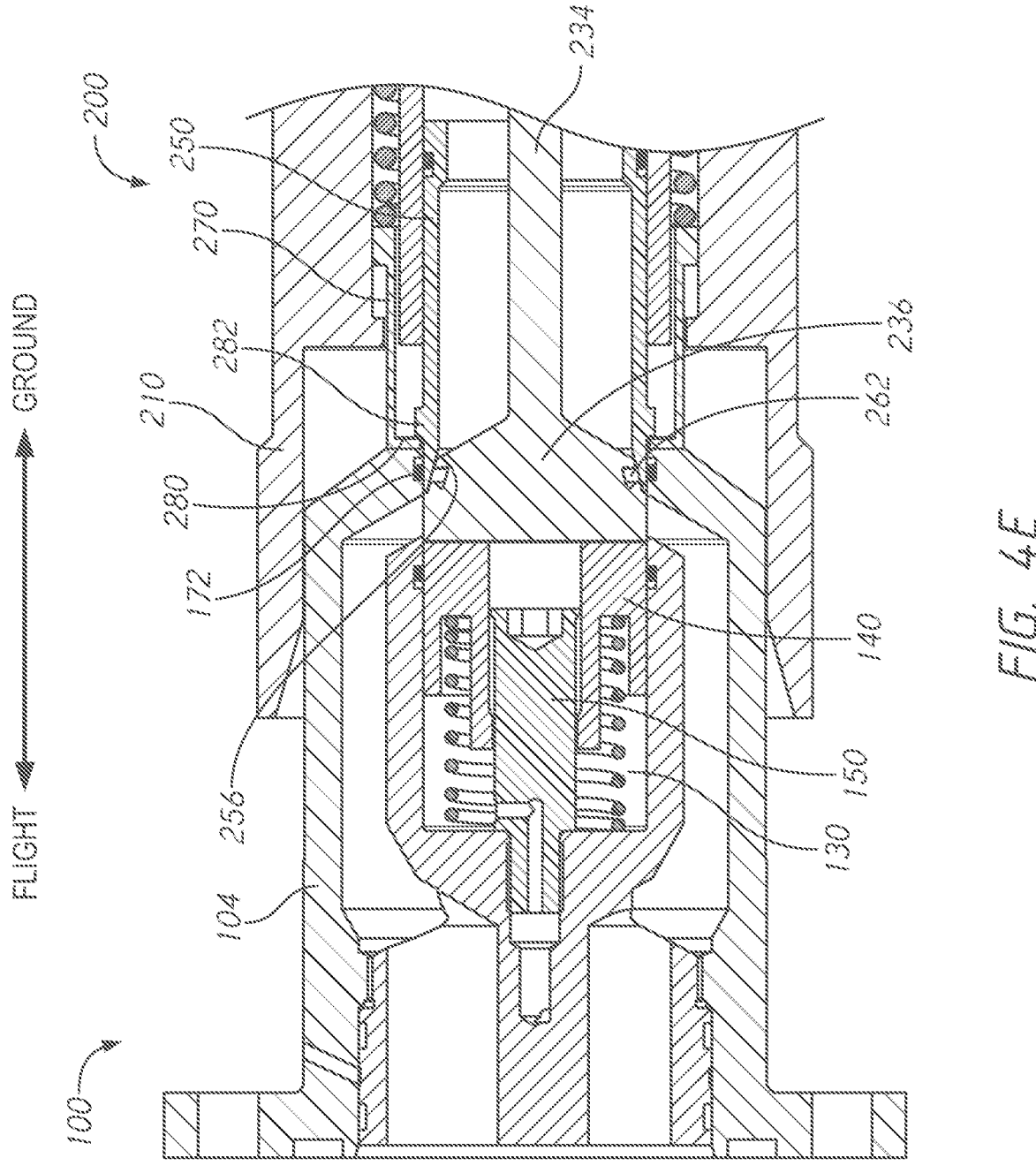
FIG. 4E is the cross-sectional side view of the first and second connectors shown in FIG. 4B, when an inner sleeve of the second connector first abuts the abutment sleeve.
Figure 4F:
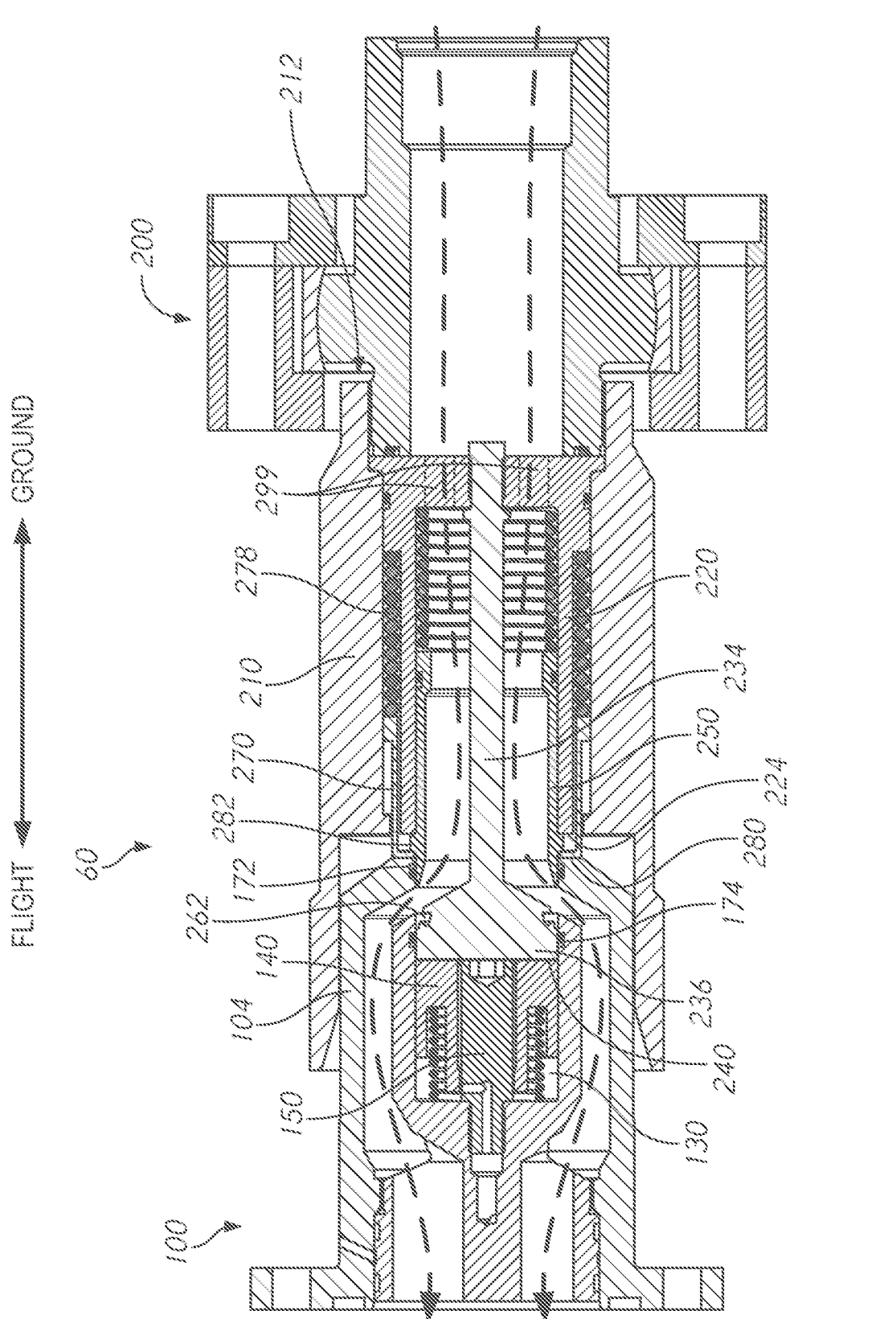
FIG. 4F is the cross-sectional side view of the first and second connectors shown in FIG. 4B, when the first connector is fully coupled with the second connector.

FIGS. 4B-4E are cross-sectional illustrations of the flight-side connector 100 and the ground-side connector 200 in various stages of coupling. Specifically, FIG. 4B illustrates the connectors 100, 200 in initial contact with each other, FIGS. 4C and 4D illustrate partial coupling wherein the abutment sleeve 270 of the ground-side connector 200 initially contacts the mating surface 116 of the outer sleeve 104 of the flight-side connector 100, FIG. 4E illustrates the point at which the inner sleeve 250 contacts the abutment sleeve 270, and FIG. 4F illustrates the flight-side connector 100 fully coupled with the ground-side connector 200. The cross-sections of FIGS. 4B, 4C, 4E, and 4F are taken along the cut-plane A-A of FIG. 4A. The cross-section of FIG. 4D is taken along the cut-plane B-B of FIG. 4A. As illustrated in FIG. 4F, fluid from a fluid source flows through the fluid paths of both the flight-side connector 100 and the ground-side connector 200 when the flight-side connector 100 is fully coupled with the ground-side connector 200, as illustrated by the broken lines. The connectors 100, 200 can be configured to operate independent of the rotational alignment between the connectors 100, 200 about the respective longitudinal axes 102, 202.

Referring now to FIG. 4B, during an initial stage of coupling the flight-side connector 100 to the ground-side connector 200, the first end 106 of the outer sleeve 104 of the flight-side connector 100 is inserted into the second end 214 of the outer sleeve 210 of the ground-side connector 200. Both the tapered opening 216 of the outer sleeve 210 of the ground-side connector 200 and the above-described six degrees-of-freedom of motion allowed by the annular ridge 288 and retaining ring 290 of the ground-side connector 200 can reduce the precision required to mate or couple the flight-side connector 100 to the ground-side connector 200.

As the outer sleeve 104 of flight-side connector 100 is further inserted into the outer sleeve 210 of the ground-side connector 200, the mating face 240 of the poppet 234 contacts the mating face 142 of the piston 140. As discussed above, the mating face 240 of the poppet 234 can be sized and shaped to match the size and shape of the mating face 142 of the piston 140 such that the mating face 240 covers all or substantially all of the mating face 142 of the piston 140.

Moving to FIG. 4C, further advancement of the outer sleeve 104 of flight-side connector 100 is further inserted into the outer sleeve 210 of the ground-side connector 200, bringing the abutment sleeve 270 into contact with the outer sleeve 104. Specifically, the mating surface 272 of the abutment sleeve 270 contacts the mating surface 116 of the outer sleeve 104. At this point in the coupling process, the head portion 236 is still in contact with the inner sleeve 250, keeping the ground-side 200 closed. Also, the piston seal 172 can be in contact with the head portion 236 such that the flight-side connector 100 remains closed with respect to the ground-side connector 200.

The head portion 236 of the poppet 234 begins pushing the piston 140 further into the piston chamber 130 against the bias force of the spring 164 before or as the abutment sleeve 270 contacts the outer sleeve 104. Displaced air or other fluid in the piston chamber 130 can be vented through the vent 160 in the piston retainer 150. The inner flange 156 of the piston bore 144 moves away from the outer flange 154 of the piston retainer 150 to break the seal between the inner flange 156 and the outer flange 154. Breaking this seal vents the piston bore 144 into the piston chamber 130.

The vented fluid/air from the piston chamber 130 can further pass through a vent passage 161 (also shown in FIG. 4D) in the inner housing 120. The vent passage 161 can fluidly connect to an annular or semi-annular circumferential passage 163 on an outer surface of the inner housing 120. The passage 163 can extend between the vent passage 161 and outer sleeve vent 162 to provide a continuous fluid pathway from the piston chamber 130 to the environment surrounding the quick disconnect system 60, via the outer sleeve vent 162 shown in FIG. 4C. In some embodiments, all or a portion of the passage 163 is formed in a radially inner wall of the outer sleeve 104.

Referring to FIG. 4E, as the outer sleeve 104 of flight-side connector 100 is further inserted into the outer sleeve 210 of the ground-side connector 200, the outer flange 282 of the inner sleeve 250 makes contact with the inner flange 280 of the abutment sleeve 270. Contact between the outer flange 282 and the inner flange 280 can prevent further movement of the inner sleeve 250 in the flight direction (e.g., toward the piston 140) with respect to the poppet head 236 and/or outer housing 140 of the flight-side connector 100.

The inner sleeve 250 can remain in contact with the poppet head 236 and/or with the poppet seal 262 at this point in the coupling process. Continued contact between the inner sleeve 250 (e.g., the second end 256 thereof) and the poppet head 236 and/or poppet seal 262 maintains the ground-side connector 200 in closed configuration.

Before or after the outer flange 282 of the inner sleeve 250 contacts the inner flange of the abutment sleeve 270, the head portion 236 of the poppet 234 further pushes the piston 140 into the piston chamber 130. The second end 256 of the inner sleeve 250 can also pass at least partially into the outer sleeve 104 of the flight-side connector 100. The piston seal 172 can form a seal against the radially-outer wall of the inner sleeve 250 as the inner sleeve 250 enters the outer sleeve 104.

As the outer sleeve 104 of flight-side connector 100 is further inserted into the outer sleeve 210 of the ground-side connector 200, as illustrated in FIG. 4F, the head portion 236 of the poppet 234 enters the piston chamber 130 and pushes the piston 140 further into the piston chamber 130. The chamber seal 174 can engage with an outer surface of the poppet head portion 236 to prevent fluid flow past the poppet head portion 236 into the piston chamber 130.

As the flight-side connector 100 is moved further into the ground-side connector 200, the outer sleeve 104 of the flight-side connector 100 pushes the abutment sleeve 270 toward the first end 212 of the outer sleeve 210 of the ground-side connector 200, against the biasing force of the spring 278. The abutment sleeve 270 (e.g., the inner flange 280 thereof) pushes the inner sleeve 250 (e.g., the outer flange 282 thereof) toward the first end 212 of the outer sleeve 210 of the ground-side connector 200 and away from the head portion 236 of the poppet 234. As the inner sleeve 250 moves away from the head portion 236 of the poppet 234, the poppet seal 262 disengages from the inner sleeve 250 and the fluid path of the ground-side connector 200 opens to allow fluid to flow through the ground-side connector 200 and the flight-side connector 100, as indicated in dashed lines in FIG. 4F.

The components of the flight-side connector 100 and the ground-side connector 200 can be dimensioned such that the quick disconnect system 60 is fully opened when the mating face 240 of the poppet 234 contacts the piston retainer 150. In some embodiments, full mating is achieved when the outer flange 282 of the inner sleeve 250 of the ground-side connector 200 is pushed against the open end 224 of the poppet sleeve 220.

When the flight-side connector 100 is disconnected or decoupled from the ground-side connector 200, the poppet head portion 236 (e.g., the poppet seal 262) can re-seat with the inner sleeve 250. This re-seating process can occur before the seal between the outer sleeve 104 (e.g., the piston seal 172) of the flight-side portion 100 and the inner sleeve 250 is broken. Accordingly, fluid flow through the quick disconnect system 60 can be shut off before the flight-side connector 100 separates from the ground-side connector 200, thereby avoiding any fluid leaks during disconnection. Additionally, the piston 140 returns to its initial closed position (FIG. 2) before the poppet head portion 236 separates from the piston 140, and before the seal between the outer sleeve 104 of the flight-side portion 100 and the inner sleeve 250 is broken. Reestablishing the seal between the piston 140 and the piston seal 172 can reduce or eliminate the risk of fluid leaks into the piston chamber 130 during disconnection.

Figure 5A:
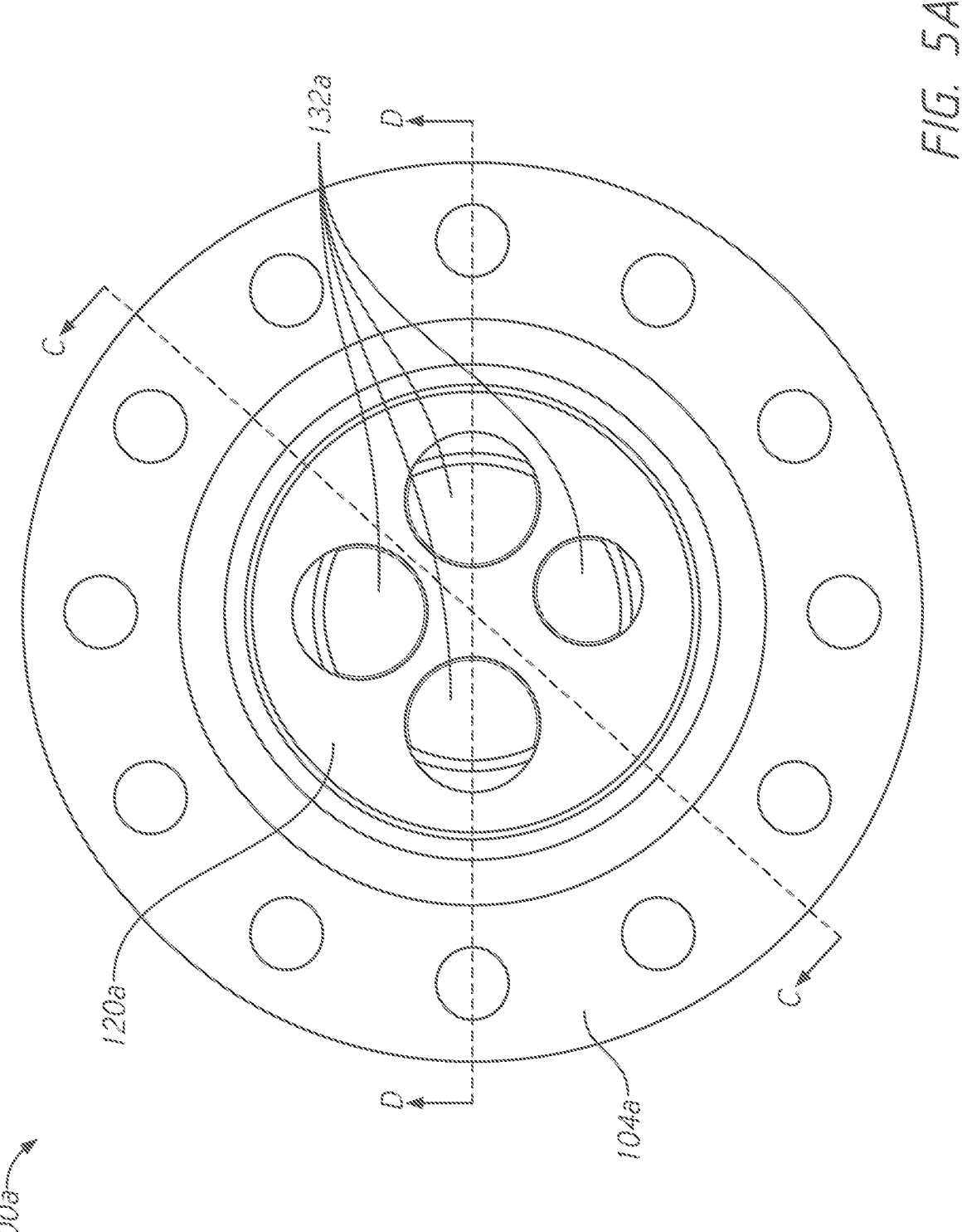
FIG. 5A is an end view of another first connector of a quick disconnect system configured in accordance with embodiments of the present technology.
Figure 5B:
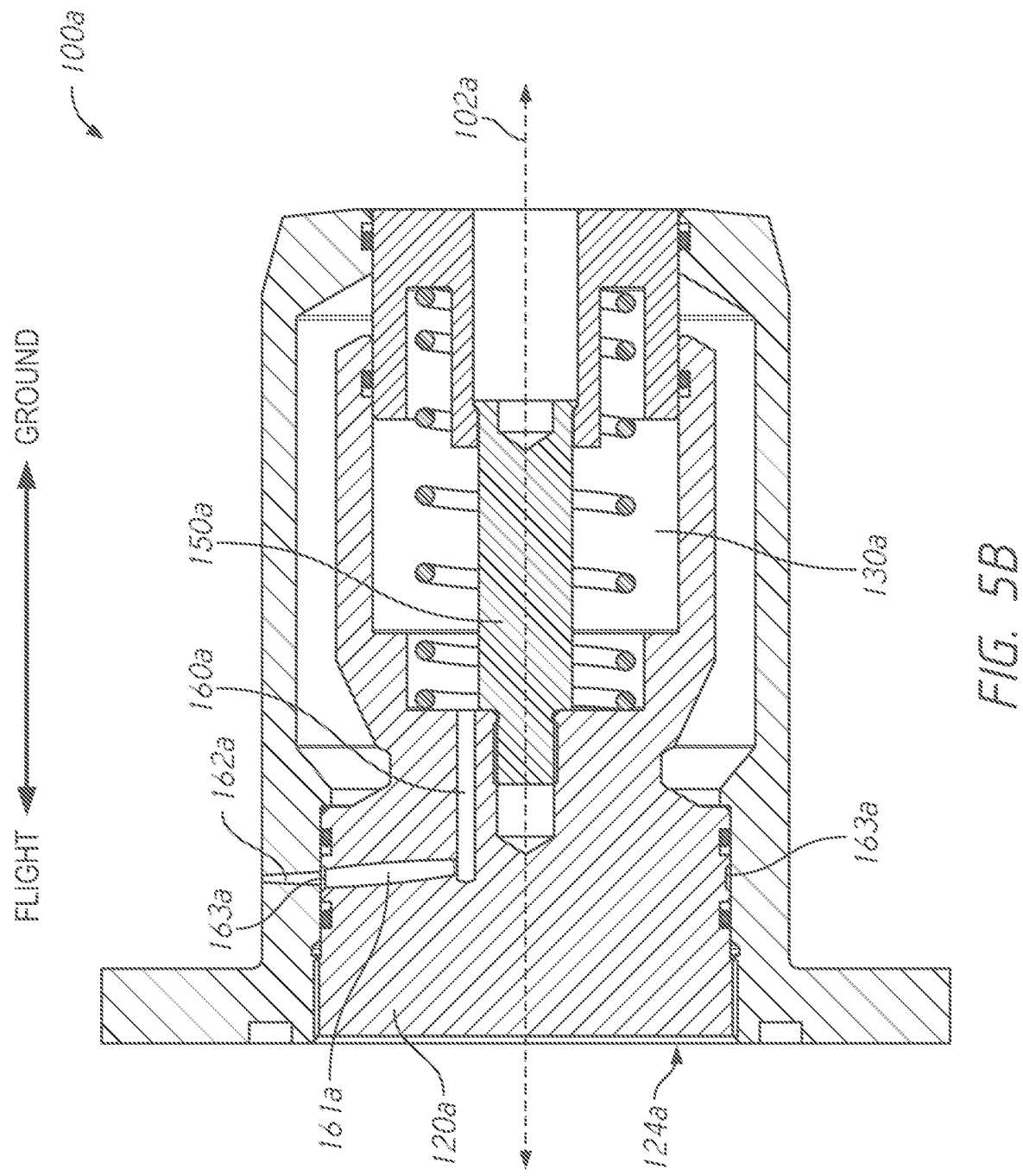
FIG. 5B is a cross-sectional side view of the first connector of FIG. 5A, taken along cut-plane C-C of FIG. 5A.
Figure 5C:
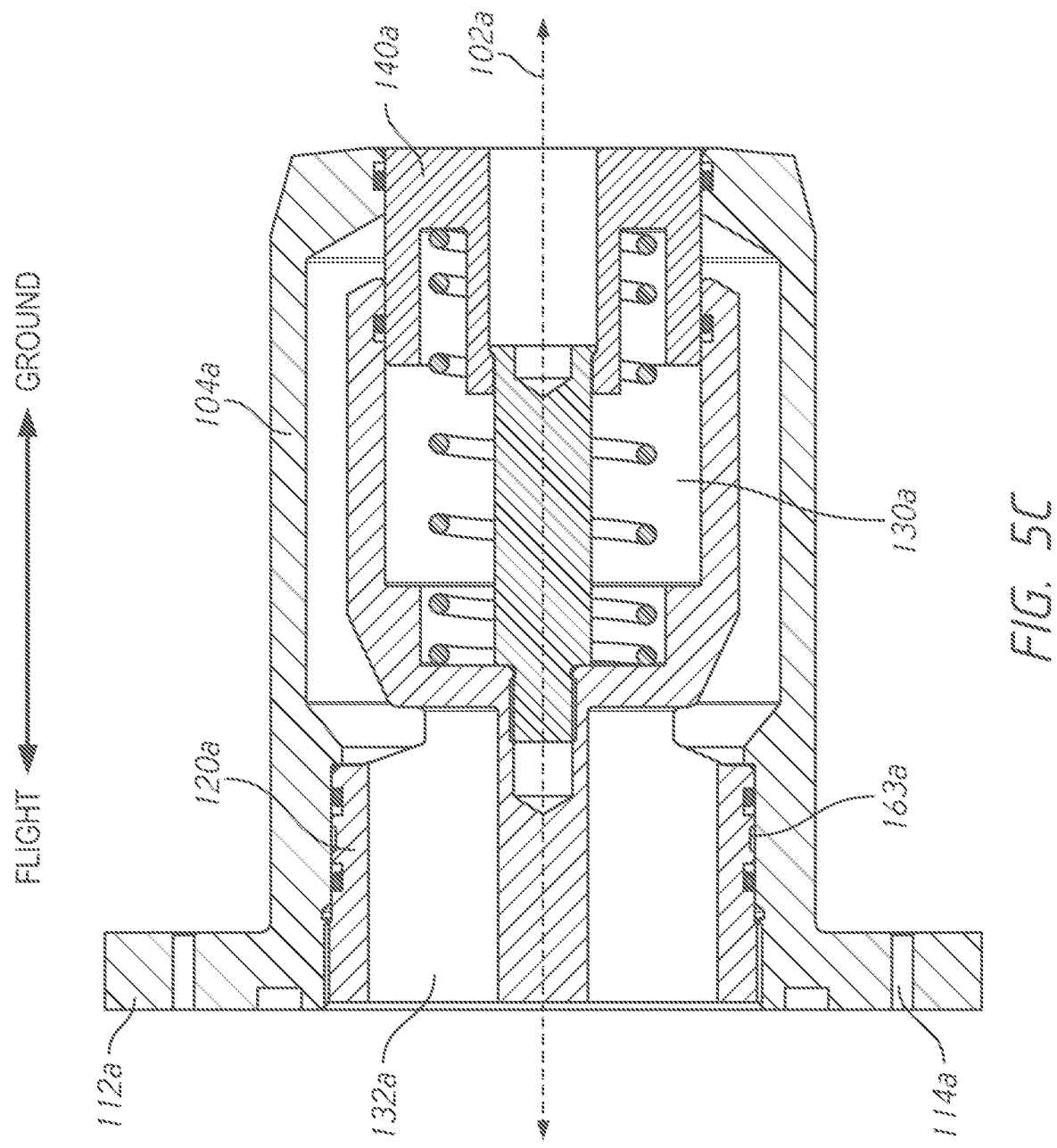
FIG. 5C is a cross-sectional side view of the first connector of FIG. 5A, taken along cut-plane D-D of FIG. 5A.

FIGS. 5A-5C illustrate an embodiment of a flight-side connector 100a configured in accordance with the embodiments of the present technology. The flight-side connector 100a is similar both structurally and functionally to the flight-side connector 100 described above. Specifically, components of the flight-side connector 100a that are similar to or the same as components of the flight-side connector 100 are identified with like reference numbers having an added "a" (e.g., piston 140a of the connector 100a is generally similar to the piston 140 described above). The descriptions of the flight-side connector 100a will therefore be limited to describing those components and features that are notably different from the corresponding components and features of the flight-side connector 100. In some embodiments, the flight-side connector 100a can be coupled with one or both of the ground-side connector 200 or the ground-side connector 200a described below. FIG. 5B is a cross-sectional view of the flight-side connector 100a taken along the cut-plane C-C of FIG. 5A, and FIG. 5C is a cross-sectional view taken along the cut-plane D-D of FIG. 5A.

Referring to FIG. 5B, the piston chamber vent 160a can extend through a portion of the inner housing 120a rather than through the piston retainer 150a. For example, the vent 160a can extend through a back wall (e.g., a wall nearest the second end 124a of the inner housing 120a) of the piston chamber 130a. In some embodiments, the vent 160a extends parallel to the longitudinal axis 102a of the flight-side connector 100a.

The vent 160a can fluidly connect with the vent passage 161a. The vent passage 161a can extend through a portion of the inner housing 120a and extend to an annular or semi-annular passage 163a on a radially outer surface of the inner housing 120a. The passage 163a can be in fluid communication with the outer sleeve vent 162a. The respective vents and passages 160a, 161a, 162a, and 163a can provide fluid communication between the piston chamber 130a and the ambient environment surrounding the flight-side connector 100a. As illustrated in FIG. 5C, the one or more apertures 132a of the inner housing 120a can be similar to or generally the same as the one or apertures 132 described above.

Figure 6:
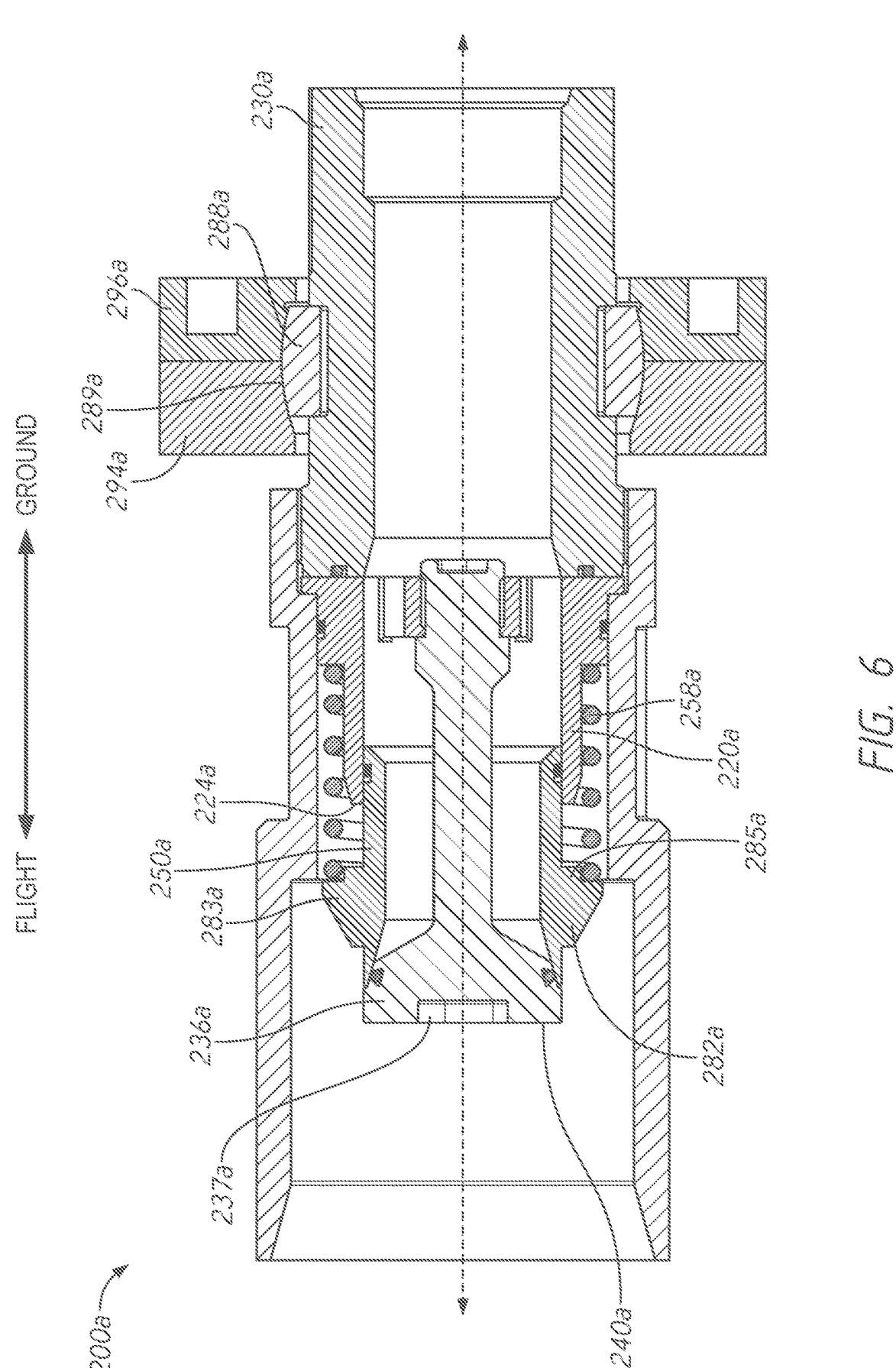
FIG. 6 is a cross-sectional side view of another second connector of a quick disconnect system configured in accordance with embodiments of the present technology.

FIG. 6 illustrates an embodiment of a ground-side connector 200a configured in accordance with the embodiments of the present technology. The ground-side connector 200a is similar both structurally and functionally to the ground-side connector 200 described above. Specifically, components of the ground-side connector 200a that are similar to or the same as components of the ground-side connector 200 are identified with like reference numbers having an added "a" (e.g., tapered opening 216a of the connector 200a is substantially similar to the tapered opening 216 described above). In some embodiments, the ground-side connector 200a can be coupled with one or both of the flight-side connector 100a or the flight-side connector 100. The descriptions of the ground-side connector 200a will therefore be limited to describing those components and features that are notably different from the corresponding components and features of the ground-side connector 200.

As illustrated in FIG. 6, the ground-side connector 200a can include an indentation 237a on the mating face 240a of the poppet head 236a. The indentation 237a can be sized and shaped to receive a portion of the piston retainer 150, 150a (FIG. 7C) during coupling between the ground-side connector 200a and a flight-side connector.

The inner sleeve 250a can be modified with respect to the inner sleeve 250 described above. For example, the inner sleeve 250a of FIG. 6 can include an outer flange 282a having a spring abutment portion 283a configured to engage with the spring 258a and an inner abutment portion 285a configured to engage the open end 224a of the piston sleeve 220a. In the illustrated embodiment of the ground-side connector 200a, the abutment sleeve 270 is removed. Removing the abutment sleeve can allow for the use of a single spring (e.g., the spring 258a) for the inner sleeve 250a without requiring an additional spring for an abutment sleeve.

The pivot adaptor 230a can include an annular ring 288a that is formed separately from the pivot adaptor 230a. The annular ring 288a can function in a manner similar to or the same as the annular ridge 288 described above. In some embodiments, the annular ring 288a has an outer gimbaled surface 289a that engages directly with an inner gimbaled surface 292a of the wall 294a and/or retainer 296a.

Figure 7A:
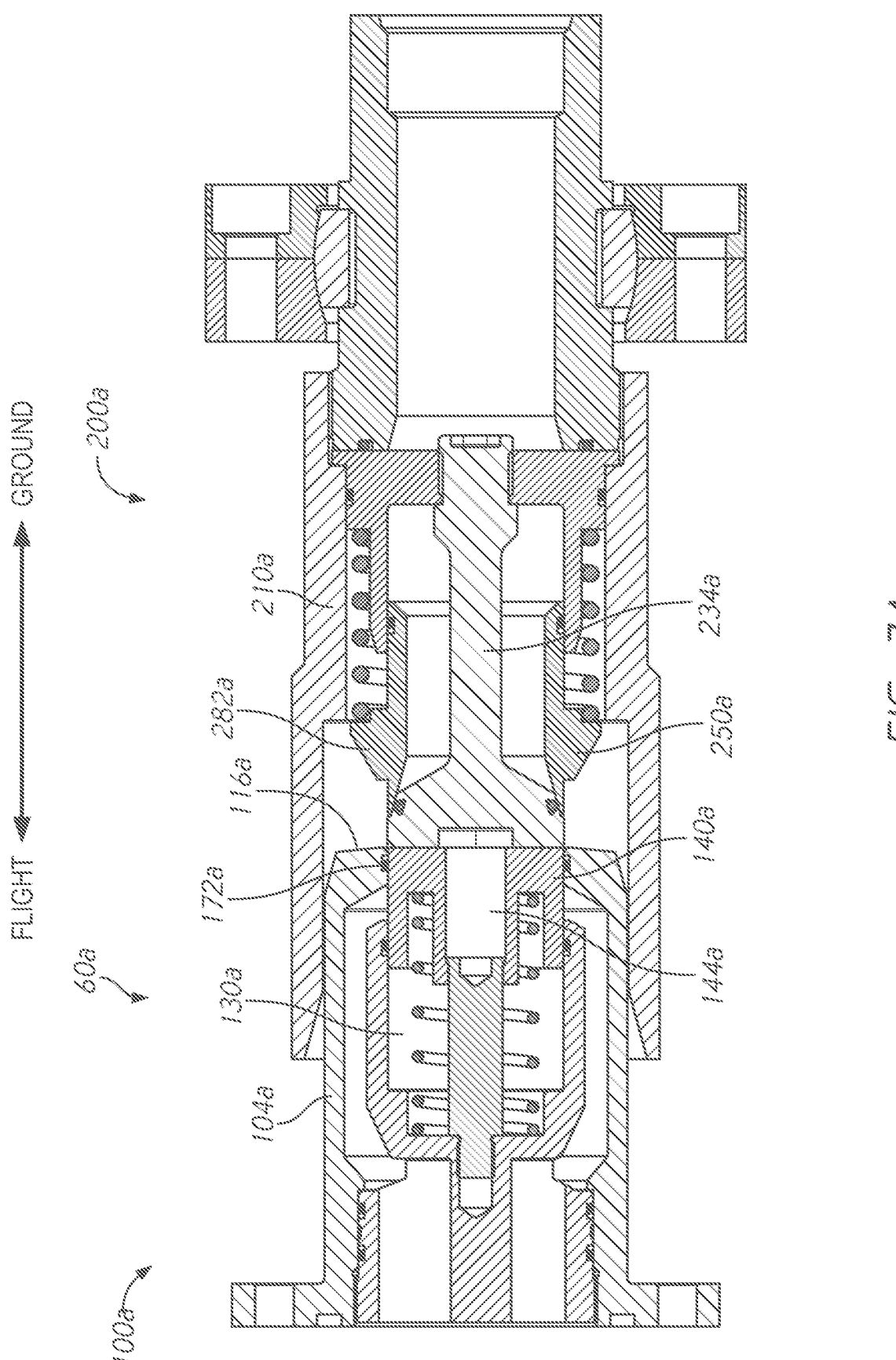
FIG. 7A is a cross-sectional side view of the first connector of FIGS. 5A-5C and the second connector of FIG. 6 at a point when a poppet of the second connector first contacts a piston of the first connector.
Figure 7B:
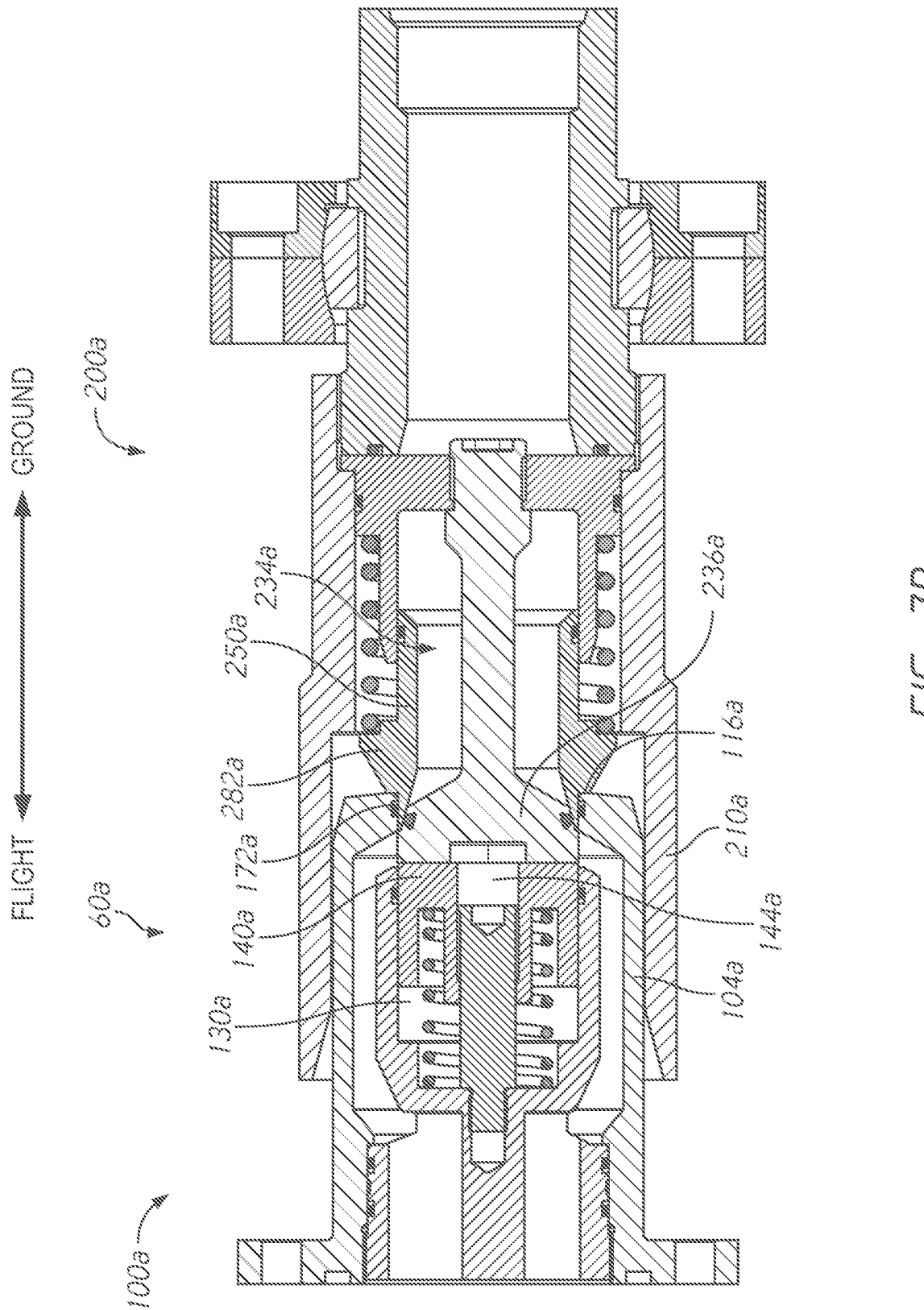
FIG. 7B is a cross-sectional side view of the first and second connectors shown in FIG. 7A, at a point when an outer flange of an inner sleeve of the second connector first contacts an outer housing of the first connector.

Moving to FIGS. 7A-7B, as the outer sleeve 104a of the flight-side connector 100a advances further into the outer sleeve 210a of the ground-side connector 200a, the poppet 234a can push the piston 140a further into the piston chamber 130a. Fluid (e.g., air) within the inner bore 144a and the piston chamber 130a can be vented through the vent 160a, the vent passage 161a, and the outer sleeve vent 162a as described above with respect to FIG. 5B.

The inner sleeve 250a can remain in sealed contact with the poppet head 236a at least until the outer flange 282a of the inner sleeve 250a abuts the mating surface 116a of the outer sleeve 104a. The piston seal 172a can remain in sealed contact with at least one of the piston 140a, the poppet head 236a, and the inner sleeve 150a when the flight-side connector 100a is decoupled from the ground-side connector 200a in a manner similar to or the same as that described above with respect to the poppet seal 172.

Figure 7C:
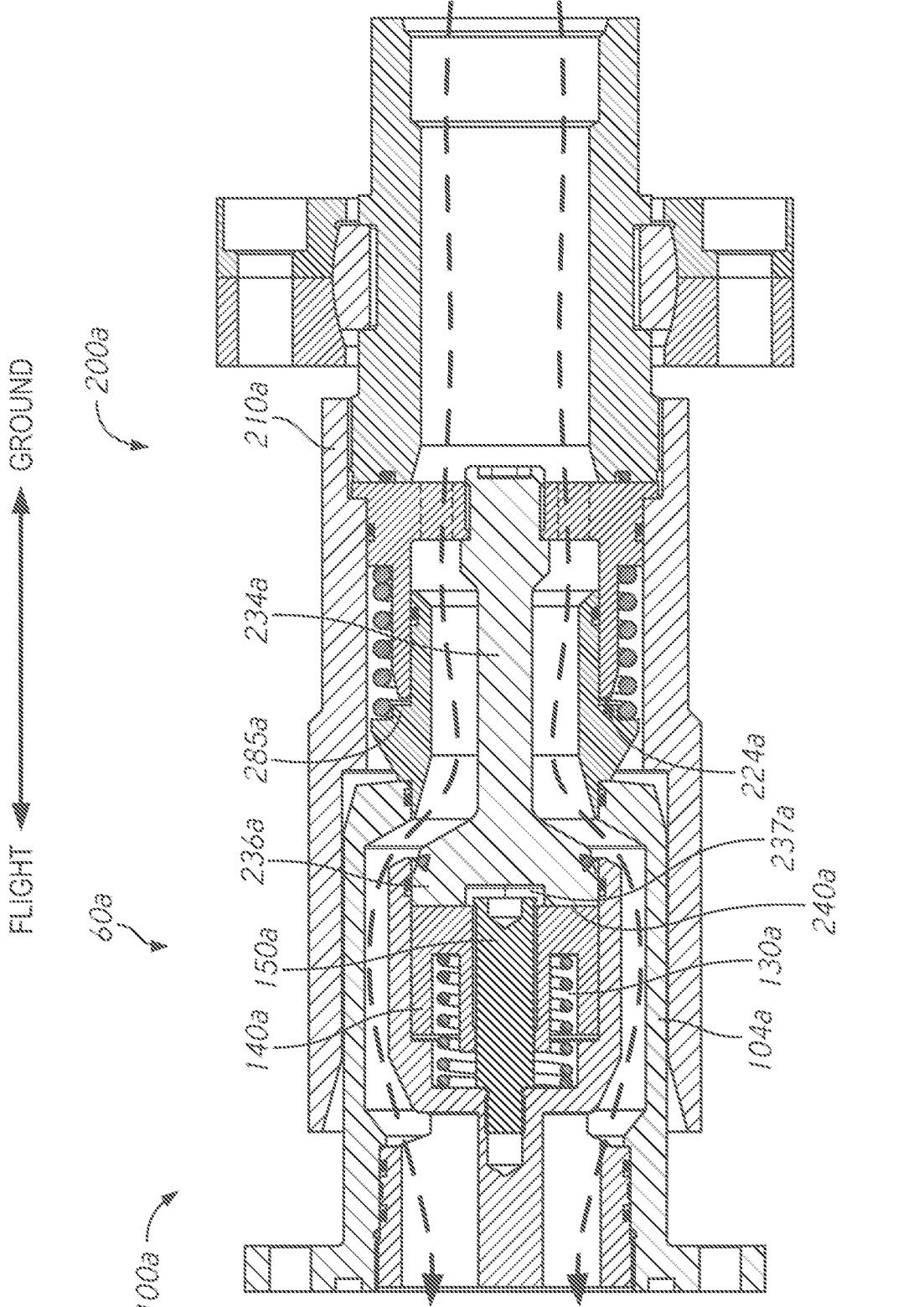
FIG. 7C is a cross-sectional side view of the first and second connectors shown in FIG. 7A, at a point when the first connector is fully coupled with the second connector.

Turning now to FIG. 7C, advancing the outer sleeve 104a of the flight-side connector 100a further into the outer sleeve 210a of the ground-side connector 200a can cause the poppet 234a to push the piston 140a further into the piston chamber 130a until the piston head 236a contacts the piston retainer 150a, until the piston 140a contacts a back wall of the piston chamber 130a, and/or until the inner abutment portion 285a of the outer flange 282a contacts the open end 224a of the poppet sleeve 220a. During this transition, the outer sleeve 104a can push the inner sleeve 250a away from the poppet head 236a, thereby opening the ground-side connector 200a and permitting fluid flow through both the ground-side connector 200a and flight-side connector 100a as illustrated by the broken arrows.

Receipt of a portion of the piston retainer 150a into the indentation 237a of the poppet head 236 can allow the piston 140a to have a longer stroke than would be the case if the indentation 237a were not present on the mating face 240a of the poppet head 236a.

One feature of several of the embodiments described above with reference to FIGS. 1-7C is that the respective flight and ground-side connectors 100, 200 do not impart fluid-induced forces on each other during connection and disconnection. This is due, at least in part, to using a "pressure balanced" inner sleeve 250 and by isolating the piston 140 from the pressurized fluid. More specifically, the portions of the inner sleeve 250 exposed to high-pressure fluid in directions parallel to the longitudinal axis of the ground-side connector 200 are generally equal in both the flight direction and ground direction (i.e., the footprints or projected surface areas of the exposed surfaces of the inner sleeve 250 are equal in both the flight direction and the ground direction). Additionally, the portions of the inner sleeve 250 exposed to high-pressure in directions perpendicular to the longitudinal axis of the ground-side connector 200 are evenly circumferentially distributed, causing the net pressure force in directions perpendicular to the longitudinal axis to be zero or approximately zero. Fluid-induced forces from the flight-side connector 100 to the ground-side connector 200 are also reduced by using a vented piston 140 that is isolated from the pressurized fluid. More specifically, as described above, the mating face 240 of the poppet 234 fully covers, or at least generally covers, the mating face 142 of the piston during connection and disconnection. Covering the mating face 142 of the piston 140 isolates the piston 140 from the high-pressure fluid in the connectors 100, 200, allowing the piston 140 to operate without receiving forces from the pressurized fluid within the connectors 100, 200. Further, venting the opposite side of the piston 140 (e.g., venting the piston chamber 130) reduces or eliminates pressure buildup on the opposite side of the piston 140, thereby reducing or eliminating fluid-induced forces (e.g., forces generated from the pressurized fluid) from the piston 140 to the poppet 234 or poppet head portion 236. Avoiding fluid-induced forces on the respective connectors 100, 200 during connection and disconnection can reduce or eliminate the risk of damage to the connectors 100, 200 and the associated fluid destinations and fluid sources attached thereto.

Another feature of several of the embodiments described above is that the connectors 100, 200 connect and disconnect from each other without, or at least generally without, fluid leaks. This, in turn, improves the efficiency of the system.

Still a further feature of embodiments of connectors 100, 200 described above is that they can facilitate fluid connection and disconnection while under pressure. More specifically, because the connectors 100, 200 can connect and disconnect without leaks, the pressure of fluid within the connectors can be maintained at or near operating pressures with little or no risk of pressure blow-off.

From the foregoing, it will be appreciated that specific embodiments of the present technology have been described herein for purposes of illustration, but that various modifications may be made without deviating from the technology. For example, the various springs are described herein as providing biasing forces on the various components of the quick disconnect system 40. In some embodiments, one or more of the springs may be replaced with elastomeric sleeves or other biasing structures. In still further embodiments, pneumatic or hydraulic forces may be used instead of or in addition to the biasing force provided by the springs. Certain aspects of the technology described in the context of particular embodiments may be combined or eliminated in other embodiments. For example, in some embodiments described above, the poppet sleeve 220 and pivot adapter 230 of the ground-side connector 200 are described as being separate parts that may be mated together or otherwise connected during manufacture. In some embodiments, the poppet sleeve 220 and pivot adapter 230 are formed as a single unitary part. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the disclosure and associated technology can encompass other embodiments not expressly shown or described herein.

As used herein, the terms "generally" and "approximately" refer to values or characteristics within a range of ±10% from the stated value or characteristic, unless otherwise indicated. As used herein, "and/or" as in "A and/or B" refers to A alone, B alone, and/or both A and B.

We claim:

1. A method of connecting a first fluid vessel and a second fluid vessel, the method comprising:

providing a first connector associated with the first fluid vessel and a second connector associated with the second fluid vessel;

engaging a piston mating face of a piston within a piston chamber of the first connector with a poppet mating face of a poppet of the second connector, wherein the piston mating face is configured to contact the poppet mating face;

enabling the piston to be pushed toward the first fluid vessel with the poppet; and enabling an inner sleeve of the second connector to be pushed toward the second fluid vessel to separate the inner sleeve from the poppet and to permit fluid flow, around a perimeter of the poppet and between the first fluid vessel and the second fluid vessel, wherein the piston is entirely within the piston chamber, and wherein the poppet mating face and a longitudinal side surface of the poppet are also within the piston chamber to be isolated from the fluid flow.

2. The method of claim 1, further comprising:

venting a side of the piston opposite the piston mating face as the poppet pushes the piston toward the first fluid vessel.

3. The method of claim 1, wherein the piston is isolated from the fluid by being entirely within the piston chamber of the first connector.

4. The method of claim 1, wherein the first fluid vessel is a fuel tank of a rocket.

5. The method of claim 1, wherein the inner sleeve of the second connector is exposed to fluid pressure forces along a longitudinal axis of the second connector.

6. A method for a quick disconnect (QD) coupling, the method comprising:

associating a first connector and a second connector in a quick disconnect coupling;

enabling a poppet head of the second connector to mate against a piston within a piston chamber of the first connector; and establishing the quick disconnect coupling for a fluid flow between the first connector and the second connector, wherein the piston of the first connector is within the piston chamber to be isolated from fluid after the quick disconnect coupling is established, and wherein a mating face and a longitudinal side surface of the poppet head is also within the piston chamber to be isolated from the fluid after the quick disconnect coupling is established.

7. The method of claim 6, further comprising:

providing a piston housing of the first connector, the piston housing comprising the piston chamber; and enabling, using the piston chamber, the piston to be entirely isolated from the fluid by the piston being entirely within the piston chamber after the quick disconnect coupling is established.

8. The method of claim 6, further comprising:

providing a piston housing of the first connector, the piston housing comprising the piston chamber; and enabling the mating face and the longitudinal side surface of the poppet head to also be isolated from the fluid by the mating face and the longitudinal side surface being within the piston chamber after the quick disconnect coupling is established.

9. The method of claim 6, further comprising:

stopping the piston from further movement within a piston chamber by a wall of the piston chamber, with the longitudinal side surface of the poppet head being within the piston chamber.

10. The method of claim 6, further comprising:

supporting movement of the piston within the first connector by an inner sleeve, the piston being around the inner sleeve;

receiving part of a piston retainer into an indentation of the poppet head during a stroke of the piston; and venting at least air from a piston chamber during the stroke of the piston using a vent of a piston housing having the piston.

11. The method of claim 6, further comprising:

enabling, using an outer sleeve of the first connector, a fluid path around a poppet stem and around a piston housing having the piston, the fluid path for the fluid to flow between the first connector and the second connector after the quick disconnect coupling is established.

12. The method of claim 6, further comprising:

enabling a fluid path for the fluid to flow between the first connector and the second connector, the fluid path comprising an outside of a piston housing having the piston of the first connector and comprising an outside of a poppet stem associated with the poppet head of the second connector.

13. The method of claim 6, further comprising:

enabling an inner sleeve of the second connector to be biased against the poppet head by a biasing spring, wherein a fluid path between the poppet and the inner sleeve is closed by the inner sleeve being biased against the poppet head.

14. A method for a flight-side connector to be used with a ground-side connector for a launch vehicle, the method comprising:

engaging a piston mating face, of a piston within a piston chamber of the flight-side connector, with a poppet mating face of a poppet head of the ground-side connector to isolate both a piston and the piston chamber of the flight-side connector from a fluid, after a fluid coupling is established between the flight-side connector and the ground-side connector; and using the piston chamber to further isolate at least a mating surface and a longitudinal side surface of the poppet head of the ground-side connector from the fluid after the fluid coupling is established.

15. The method of claim 14, further comprising:

causing a piston housing, which comprises the piston chamber of the flight-side connector, to entirely comprise the piston within the piston chamber after the fluid coupling is established, wherein the piston being within the piston chamber is entirely isolated from the fluid.

16. The method of claim 14, further comprising:

causing a piston housing, which comprises the piston chamber of the flight-side connector, to comprise the mating surface and the longitudinal side surface of the poppet head within the piston chamber after the fluid coupling is established, wherein the mating surface and the longitudinal side surface of the poppet head being within the piston chamber is isolated from the fluid.

17. The method of claim 14, further comprising:

causing the piston to stop from further movement within the piston chamber by a piston wall of the piston chamber, with the longitudinal side surface of the poppet head being within the piston chamber.

18. A method for a ground-side connector to be used with a flight-side connector for a launch vehicle, the method comprising:

using a poppet with a poppet head, of the ground-side connector, to engage a piston mating face of a piston within a piston chamber of the flight-side connector with a poppet mating face of the poppet head, wherein the piston is movable relative to the flight-side connector and is to be isolated in the piston chamber from a fluid after a fluid coupling is established between the flight-side connector and the ground-side connector; and using the poppet to further cause a mating surface and a longitudinal side surface of the poppet head to be within the piston chamber, the piston chamber to be isolated from the fluid after the fluid coupling is established.

19. The method of claim 18, wherein the ground-side connector comprises an inner sleeve that is biased against the poppet head by a biasing spring, wherein the method further comprises:

opening a fluid path between the inner sleeve and the poppet head by a first movement of inner sleeve against the biasing spring; and closing a fluid path between the inner sleeve and the poppet head by a second movement of the inner sleeve, with the biasing spring.

20. The method of claim 18, wherein the ground-side connector comprises an outer sleeve, an inner sleeve, a biasing spring and a poppet sleeve, and wherein the method further comprises:

allowing the biasing spring to bias the inner sleeve against the poppet head to close a fluid path of the fluid coupling, wherein the poppet sleeve is to support the poppet and is to support the biasing spring between the outer sleeve and the inner sleeve.

* * * * *